US006348773B1

(12) United States Patent
Dvorkis et al.

(10) Patent No.: US 6,348,773 B1
(45) Date of Patent: Feb. 19, 2002

(54) LASER SCANNER FOR CONTROLLING THE OPTICAL SCANNING OF BAR CODES

(75) Inventors: Paul Dvorkis, Stony Brook; Edward Barkan, Miller Place; Harold Charych, East Setauket; James Giebel, East Northport; Stephen Osterweil, Plainview; Sundeep Kumar, East Setauket; John Barile, Holbrook; Paul R. Poloniewicz, East Setauket; Anthony D. Biuso, South Setauket; Steven M. Chew, East Northport, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 08/949,494

(22) Filed: Oct. 14, 1997

Related U.S. Application Data

(62) Division of application No. 08/614,840, filed on Mar. 5, 1996, now Pat. No. 5,705,800, which is a division of application No. 08/332,581, filed on Oct. 31, 1994, now Pat. No. 5,561,283, which is a continuation of application No. 08/037,143, filed on Mar. 25, 1993, now abandoned, which is a division of application No. 07/715,267, filed on Jun. 14, 1991, now Pat. No. 5,235,167, which is a continuation-in-part of application No. 07/506,674, filed on Apr. 9, 1990, now abandoned, which is a continuation of application No. 07/260,692, filed on Oct. 21, 1988, now Pat. No. 4,933,538.

(51) Int. Cl.[7] .................. A02K 29/08; H02K 29/08; H02K 33/16
(52) U.S. Cl. ................ 318/685; 318/127; 318/627; 235/462.36

(58) Field of Search .................. 235/462.36, 467; 318/280, 282, 286, 291, 293, 599, 685, 627, 127

(56) References Cited

U.S. PATENT DOCUMENTS

| 4,593,186 | A | * | 6/1986 | Swartz et al. ............... 235/472 |
| 4,811,835 | A | * | 3/1989 | Bullivant .................... 198/762 |
| 4,933,620 | A | | 6/1990 | MacMinn et al. ........... 318/696 |
| 5,130,618 | A | | 7/1992 | Pardoe ........................ 318/114 |
| 5,280,163 | A | * | 1/1994 | Barkan ........................ 235/462 |
| 5,479,557 | A | | 12/1995 | Ganz et al. .................. 388/829 |
| 5,519,301 | A | | 5/1996 | Yoshida et al. ............. 318/811 |
| 5,569,991 | A | * | 10/1996 | Matsuoka et al. ........... 318/286 |
| 5,598,070 | A | | 1/1997 | Coleman ................ 235/462 X |
| 5,625,268 | A | * | 4/1997 | Miyanari .................... 318/696 |

* cited by examiner

Primary Examiner—Paul Ip
(74) Attorney, Agent, or Firm—Clifford Chance Rogers & Wells; Mitchell S. Feller

(57) ABSTRACT

A scanner determines whether a target is a bar code symbol and, if so, whether that symbol is one-dimensional or two-dimensional. For two-dimensional symbols, the scanner aligns a scanning pattern with the symbol and expands the scanning pattern to reach only to the top and bottom edges of the symbol, not beyond. The scanner also has a microprocessor-control scanning engine that uses a coil to drive a scanning element and pick up feed back signals from the scanning element. A pulse-width-modulated regulator also provides fast and efficient operation for driving the coil. The scanning engine can also be designed to generate a pattern that precesses across the target, and a powerful interface to the scanning engine allows decoding and control logic to work efficiently with and independently of the scan engine.

8 Claims, 28 Drawing Sheets

TO SCAN ENGINE

| | | | | | | | | | |
|---|---|---|---|---|---|---|---|---|---|
| CALIBRATION | 0 | 0 | 0 | 0 | 0 | 0 | 0 | 0 | 0x00 |
| AIM SLAB | 0 | 0 | 0 | 0 | 0 | 0 | 0 | 1 | 0x01 |
| AIM DOT | x | x | x | x | 0 | 0 | 1 | 1 | 0x02 |
| SET Y ANGLE | x | x | x | x | 0 | 1 | 0 | 0 | 0x03 |
| OPEN Y | x | x | x | x | 0 | 1 | 0 | 1 | 0x04 |
| CLOSE Y | x | x | x | x | 0 | 1 | 1 | 0 | 0x05 |
| BRAKE | x | x | x | x | 0 | 1 | 1 | 1 | 0x06 |
| STATUS REQ. | 0 | 0 | 0 | 0 | 1 | 0 | 0 | 0 | 0x07 |

FROM SCAN ENGINE

| | | | | | | | | | |
|---|---|---|---|---|---|---|---|---|---|
| OPEN Y DONE | 0 | 0 | 0 | 0 | 0 | 1 | 0 | 0 | 0x04 |
| CLOSE Y DONE | 0 | 0 | 0 | 0 | 0 | 1 | 0 | 1 | 0x05 |
| X-AMP. DONE | 0 | 0 | 0 | 0 | 0 | 1 | 1 | 0 | 0x06 |
| STATUS | x | x | x | x | 0 | 1 | 1 | 1 | 0x07 |
| RESET DONE | x | x | x | x | 1 | 1 | 1 | 1 | 0x0F | xxxx INDICATES PARAMETER OR DATA INFORMATION

LASER SCANNER FOR CONTROLLING THE OPTICAL SCANNING OF BAR CODES

This is a division of application Ser. No. 08/614,840, filed Mar. 5, 1996, now U.S. Pat. No. 5,705,800, which is a division of application Ser. No. 08/332,581, filed Oct. 31, 1994, now U.S. Pat. No. 5,561,283, which is a continuation of Ser. No. 08/037,143, filed Mar. 25, 1993 (abandoned), which is a division of Ser. No. 07/715,267, filed Jun. 14, 1991, now U.S. Pat. No. 5,235,167, which is a continuation-in-part of Ser. No. 07/506,674, filed Apr. 9, 1990 (abandoned) which is a continuation of Ser. No. 07/260,692, filed Oct. 21, 1988, now U.S. Pat. No. 4,933,538. This application is also related to Ser. No. 07/818,731, filed Jan. 6, 1992, now U.S. Pat. No. 5,229,591, which was a continuation of Ser. No. 07/506,674, filed Apr. 9, 1990, now abandoned. This application is further related to Ser. No. 07/317,433, filed Mar. 1, 1989, now abandoned; to Ser. No. 07/520,464, filed May 8, 1990, now U.S. Pat. No. 5,168,149; Ser. No. 07/544,628, filed Jun. 27, 1990, now U.S. Pat. No. 5,117,098.

I. RELATED PATENTS AND APPLICATIONS

This application is a continuation-in-part of U.S. patent application Ser. No. 08/294,438 (abandoned), filed Aug. 23, 1994. This application is also related to U.S. patent application Ser. No. 818,731, filed Jan. 6, 1992, now U.S. Pat. No. 5,229,591, which was a continuation of Ser. No. 07/506,674 (abandoned). This application is further related to U.S. patent application Ser. No. 07/317,433, filed Mar. 1, 1989 (abandoned); to U.S. patent application Ser. No. 07/520,464, filed May 8, 1990, which issued as U.S. Pat. No. 5,168,149; and U.S. patent application Ser. No. 07/544,628, filed Jun. 27, 1990, which issued as U.S. Pat. No. 5,117,098. All of these applications and patents have been assigned to Symbol Technologies, Inc.

II. BACKGROUND OF THE INVENTION

This invention relates generally to the design of scanning systems for reading bar code symbols or similar indicia, and more particularly, to scanning both one-dimensional and two-dimensional bar codes symbols automatically. Most conventional optical scanning systems can read either one-dimensional or two-dimensional bar code symbols. A bar code symbol is a coded pattern of indicia having a series of variable-width bars separated by variable-width spaces, the bars and spaces having different light-reflecting characteristics. One example of a one-dimensional bar code is the UPC/EAN code currently in use for identifying articles and other information. One example of a two-dimensional, or stacked, bar code is the PDF417 bar code described in U.S. Pat. No. 5,159,639, which is incorporated herein by reference.

Most scanning systems, or scanners, generate a beam of light which reflects off a bar code symbol so the scanning system can receive the reflected light. The system then transforms that reflected light into electrical signals, and decodes those electrical signals to extract the information embedded in the bar code symbol. Scanning systems of this general type are described in U.S. Pat. Nos. 4,251,798; 4,360,798; 4,369,361; 4,387,297; 4,409,470; and 4,460,120, all of which have been assigned to Symbol Technologies, Inc.

Because both one-dimensional symbols and two-dimensional symbols are currently being used, it would be simpler and more efficient if a single scanning system could not only distinguish a bar code symbol from other markings, such as text, but also decode the symbol whether it is one-dimensional or two-dimensional. This operation is particularly important when the bar code symbol is skewed relative to the scanning patterns of the scanner.

An additional problem for such scanning systems occurs when decoding two-dimensional bar code symbols. These symbols do not all have the same height, so the scanning system must expand its scanning pattern to cover the entire two-dimensional symbol. Some conventional systems do this but sometimes cover areas outside of the symbol. Although using such a large pattern does not affect the accuracy of the scanner, it is inefficient. The portions of the scanning pattern which lay outside the bar code symbol are useless, and scanning these areas slows down the scanning operation. In addition, forcing the scanning pattern to be too large reduces the accuracy of decoding the two-dimensional bar code symbol.

Building a system to overcome these problems is not only difficult, it is complicated by an additional concern. Scanners should not become any larger for ergonometric and economic reasons. Thus, more powerful and flexible scanning devices must be compact.

Another concern is speed. The additional processing needed for increased efficiency and flexibility must not come at the expense of speed. That processing must therefore proceed quickly and efficiently.

Yet another concern is the need to ensure that the different scanner subsystems communicate with each other effectively as they become more robust. Scanning systems typically have different subsystems, such as the scanning engine, the optical sensor, and the decoder. The interfaces between these different subsystems must support the required processing power and allow one to improve one part a scanning system without redesigning other systems.

To obtain a scanner with all these features is very difficult indeed. The fast-increasing use of bar codes, however, demands that scanning systems have increasing flexibility, robustness, and efficiency.

It is therefore an object of this invention to provide a scanner capable of differentiating between one-dimensional and two-dimensional bar codes, and of decoding them automatically and appropriately even if they are not initially aligned with the scanner.

It is also an object of the invention to ensure that the scanning pattern can precess to change the location of the scan lines.

It is another object of the invention to adjust the height of the scanning patterns automatically to ensure that the scanning pattern covers the entire symbol without extending outside the symbol.

A further object of the invention is to provide a fast but compact scanning engine to generate scanning patterns for both one-dimensional and two-dimensional bar codes.

It is also an object of the invention to have such a scanning engine adapt itself to the different characteristics of the scanning elements.

It is a further object of the-present invention to have such a powerful and flexible scanning engine communicate with the remainder of the scanner over a robust and flexible interface.

III. SUMMARY OF INVENTION

To achieve these objects, the present invention provides a system for examining the optical reflections to determine whether a sensed target is a bar code symbol and, if so, whether that symbol is a one-dimensional or two-dimensional code. If the symbol is a two-dimensional code, the present invention aligns the two-dimensional scanning pattern with the symbol and expands the pattern to the top and bottom edges of the symbol.

In addition, the present invention provides a microprocessor-controlled scan engine that uses a coil both to drive a scanning element and to pick up feedback signals representing the motion of the scanning element. The scan engine also uses different circuit techniques to avoid degrading the system, and has a powerful interface to decoding and control logic of the scanner. The scan engine may be set to ensure that two-dimensional scanning patterns precess to move the scan lines at different portions of the bar code symbols to avoid any gaps that may otherwise occur.

Specifically, a control circuit for driving a coil to produce a desired magnetic field according to this invention comprises a pulse width modulation regulator, coupled to the coil, for causing a desired current to flow through the coil in accordance with an analog drive signal; a digital-to-analog converter, coupled to the pulse width modulation circuit, for creating the analog drive signal from a digital drive signal; and a controller, coupled to the digital-to-analog converter, for generating the digital drive signal.

A method for driving a coil according to this invention comprises the steps of generating a desired current signal to flow through the coil in accordance with an analog drive signal; creating the analog drive signal from a digital drive signal; and generating the digital drive signal.

A control circuit according to this invention for driving a scanning element to produce a desired scanning pattern comprises a coil producing a magnetic field to control the movement of the scanning element; a pulse width modulation regulator, coupled to the coil, for causing a desired current to flow through the coil in accordance with an analog drive signal; a digital-to-analog converter, coupled to the pulse width modulation circuit, for creating the analog drive signal from a digital drive signal; and a controller, coupled to the digital-to-analog converter, for generating the digital drive signal.

A control system according to this invention for controlling the optical scanning of an object comprises a scan control section; a detector section coupled to the scan control section; and an interface channel between the detector section and the scan control section for carrying commands in a defined format from the detector section to the scan control section, and for carrying messages in the defined format from the scan control section to the detector section. The scan control section includes a scanning element for causing a light beam to move relative to the object, a processor for receiving external commands, for generating internal control signals from the external commands, and for forming messages; and a scanning element driver for energizing the scanning element to cause the light beam to move in a predetermined pattern in response to the internal scanning control signals. The detector section includes a light beam scanner directing the light beam toward the scanning element; a detector mounted to receive portions of the light beam reflected from the object and to generate electrical signals representing the received, reflected light beam; and central control means for receiving the electrical signals, for forming the external commands, and for receiving the messages.

A scanner according to this invention for scanning a light beam across a two-dimensional pattern comprises a light source for creating the light beam; a scanning element for moving the light beam in the two-dimensional pattern; x-drivers for causing the scanning element to move the light beam in a first direction at a first frequency in response to x-driver signals; y-drivers for causing the scanning element to move the light beam in a second direction at a second frequency in response to y-driver signals, the first and second directions being orthogonal to each other; and scanning control circuitry for generating the x-driver signals and the y-driver signals at the first and second frequencies that are not integer multiples of each other, thereby causing the two-dimensional pattern to precess.

A bar code reader according to this invention for reading a bar code symbol having a defined boundary comprises a light beam scanner for directing a light beam toward a target in a predetermined pattern; a detector for receiving portions of the light beam reflected from the target and generating electrical signals representing the received, reflected light beam; identifier means for determining whether the target is a bar code symbol; and feedback means, responsive to the electric signals, for controlling the scanner to conform the shape of the predetermined pattern to the boundary of the target if it is a bar code symbol.

IV. BRIEF DESCRIPTION OF DRAWINGS

The accompanying drawings provide a further understanding of the invention and, together with the description, explain the principles of the invention.

FIG. 13 is a diagram showing the preferred construction of a PWM regulator used in the scan engine of FIG. 12;

V. DESCRIPTION OF THE PREFERRED IMPLEMENTATIONS

Figure 1:
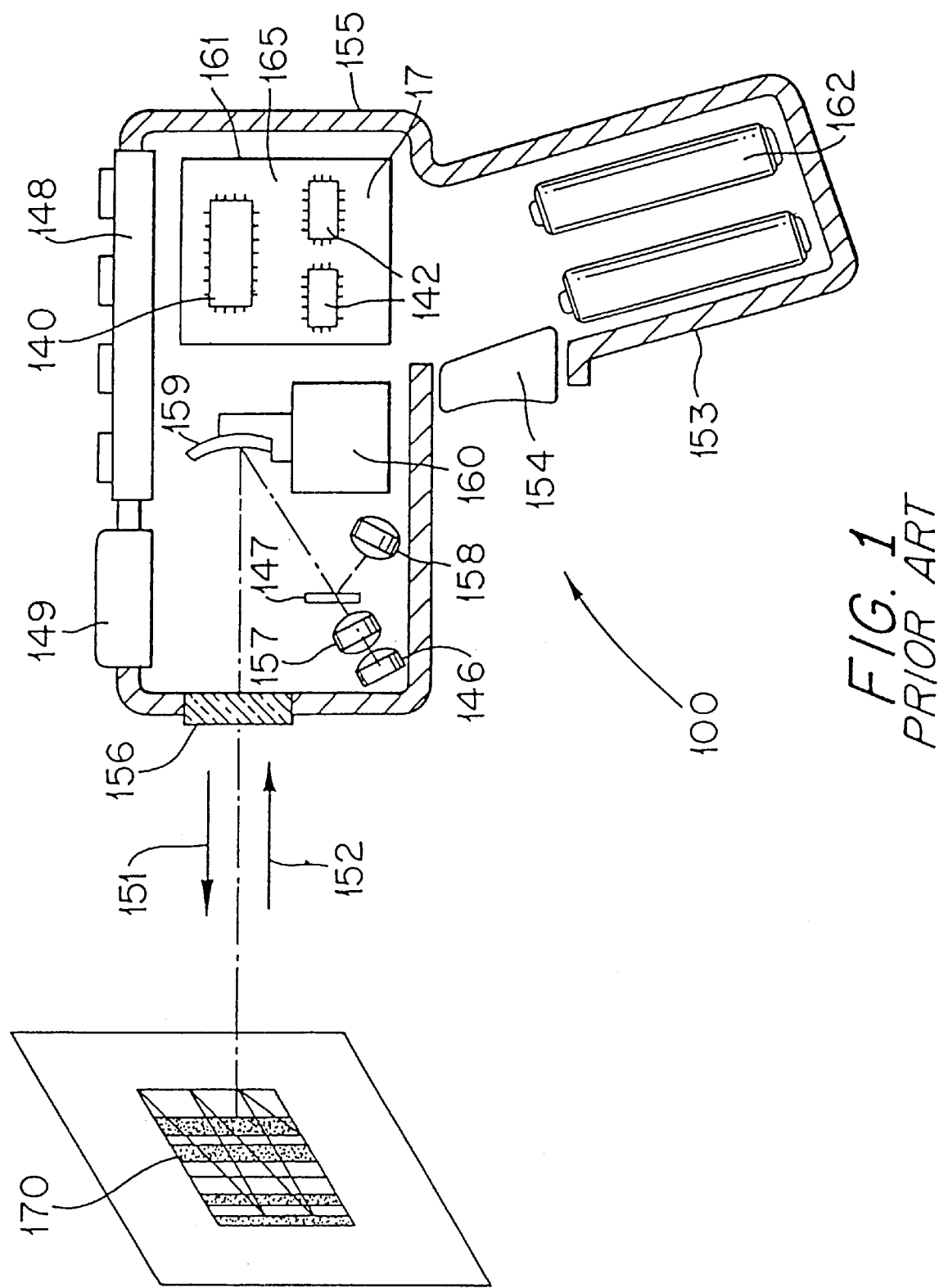
FIG. 1 is a simplified diagrammatic representation of one embodiment of a laser scanning system according to this invention.

The following description of the preferred implementations of this invention do not describe all possible implementations. In the description, like reference numerals in different figures refer to like parts, unless indicated otherwise.

A. Overview

Unless the context or specific instructions indicate otherwise, the terms "symbol" and "bar code" should be construed broadly in this specification and the following claims. For example, those terms cover any number of patterns having alternating bars and spaces, including those of various widths, and one-dimensional or two-dimensional graphic patterns other than those specifically mentioned.

The present invention relates to scanning systems including those that can automatically initiate and terminate scanning of a target. Some scanning systems with this automatic capability use a manually-operated trigger to initiate scanning of the target, such as U.S. Pat. No. 4,387,297 describes. Although the trigger is important for many applications, some applications benefit from other techniques, and this invention includes such techniques.

FIG. 1 shows a highly simplified embodiment of a bar code scanner 100 that may be constructed according to the principles of the present invention. Although FIG. 1 shows scanner 100 as hand-held, the invention does not require that the scanner be in this form. For example, the scanner could include a desktop workstation or have some other type of stationary architecture. Scanner 100 may also function as a portable computer terminal and include a keyboard 148 and a display 149, such as described in U.S. Pat. No. 4,409,470.

Hand-held scanner 100 of FIG. 1 has the style described generally in U.S. Pat. Nos. 4,760,248 or 4,896,026, both assigned to Symbol Technologies, Inc. Scanner 100 also has a similar design to the bar code reader commercially available as part number LS 8100 or LS 2000 from Symbol Technologies, Inc.

A user aims scanner 100 at bar code symbol 170 without physically touching it. Typically, scanner 100 operates several inches from the bar code symbol being read.

To construct scanner 100, the ordinary-skilled artisan may refer to U.S. Pat. Nos. 4,387,297; 4,409,470; 4,760,248; 4,896,026; and 4,387,298, all of which are incorporated herein by reference. To assist in the understanding of the claimed invention, however, the major features of scanner 100 are described below.

Scanner 100 is preferably gun-shaped in a housing 155 having a pistol-grip handle 153. A movable trigger 154 on handle 153 allows a user to activate a light beam 151 and associated detector circuitry when the user has pointed scanner 100 at a symbol 170.

Housing 155, which is preferably made of lightweight plastic, contains laser light source 146 (which may be a semiconductor laser diode or other light source), lens 157, partially-silvered mirror 147, detector 158, oscillating mirror 159, motor 160, power source (battery) 162, and signal processing and control circuitry 165. Circuitry 165 includes CPU 140 and decoding and control electronics 142 on a printed circuit board 161.

When a user activates scanner 100 by pulling trigger 154, light source 146 generates light beam 151 along the axis of lens 157. Lens 157, which is not necessary in all embodiments, may be a single lens or a multiple lens system. After passing through lens 157, beam 151 passes through partially-silvered mirror 147 and, if desired, other lenses or beam-shaping structures. Beam 151 then strikes oscillating mirror 159 driven by scanning motor 160, which together direct beam 151 in a scanning pattern. Preferably, motor 160 also starts when the user pulls trigger 154.

If light beam 151 is invisible, the optical system may include an aiming light parallel to beam 151 to help the user aim scanner 100. The aiming light is a visible beam of light that may either be fixed or follow light beam 151.

Figure 2:
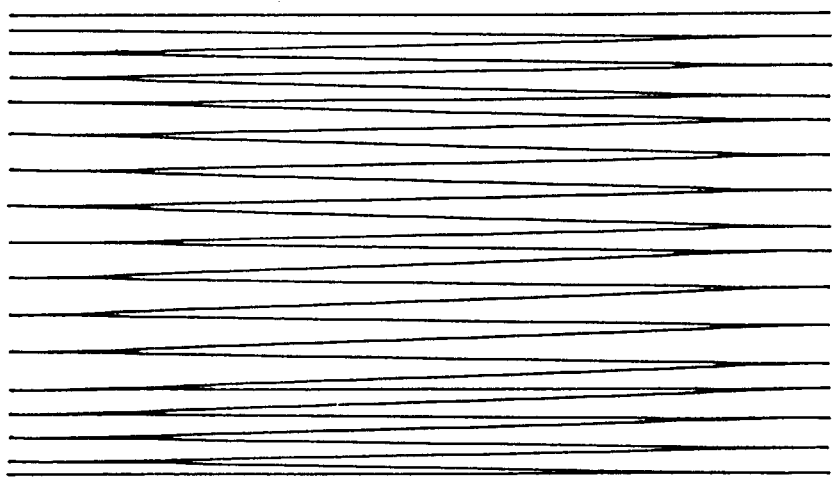
FIG. 2 is a diagram of a conventional raster scanning pattern.

Mirror 159 directs light beam 151 through a light-transmissive window 156 and across bar code symbol 170 in some predetermined pattern, such as a linear raster scan pattern. FIG. 2 is a diagram depicting the pattern of a known linear raster scanner. The two-dimensional scanning pattern can be generated by displacing in the vertical or y direction a one-dimensional or linear scan line driven in the horizontal or x direction. U.S. Pat. No. 4,387,297 explains a technique for forming the scanning pattern in FIG. 2.

Symbol 170 can be a one-dimensional bar code, such as the standard UPC/EAN code, or a two-dimensional bar code, such as PDF417 described in U.S. Pat. No. 5,159,639. In addition, as explained above, symbol 170 can be any other acceptable symbol carrying information to be decoded.

Light beam 152 is the light from beam 151 reflected off symbol 170. Beam 152 returns to scanner 100 along a path parallel to, or at times coincident with, beam 151. Beam 152 thus reflects off mirror 159 and strikes partially-silvered mirror 147. Mirror 147 reflects some of beam 152 onto a light-responsive detector 158 that converts light 152 into electrical signals.

The electrical signals then pass into signal processing and control circuitry 165 to be processed and decoded to extract the information represented by the bar code. Signal processing and control circuitry 165 also controls the operation of motor 160 to adjust the scanning pattern and provide other control.

B. Adaptive Scanning

1. Identifying a Bar Code Symbol

The scanner of this invention addresses two concerns. The first is to ensure that the target being scanned is a bar code. The second is to identify the type of bar code.

The purpose of ensuring that the scanned target is a bar code is obvious. The purpose of identifying the type of bar code is to adjust the scan pattern to improve detection.

To accomplish both purposes, a system according to the present invention samples light reflected from a portion of a target and analyzes those samples. The system first determines whether the target is a bar code symbol. If so, the system next determines whether the bar code symbol is one-dimensional or two-dimensional. If the symbol is one-dimensional, the system decodes the signals received from the scan. If the bar code is two-dimensional, the system ensures the scanning pattern is properly oriented and then begins to expand the scanning pattern to cover the entire code.

Figure 3:
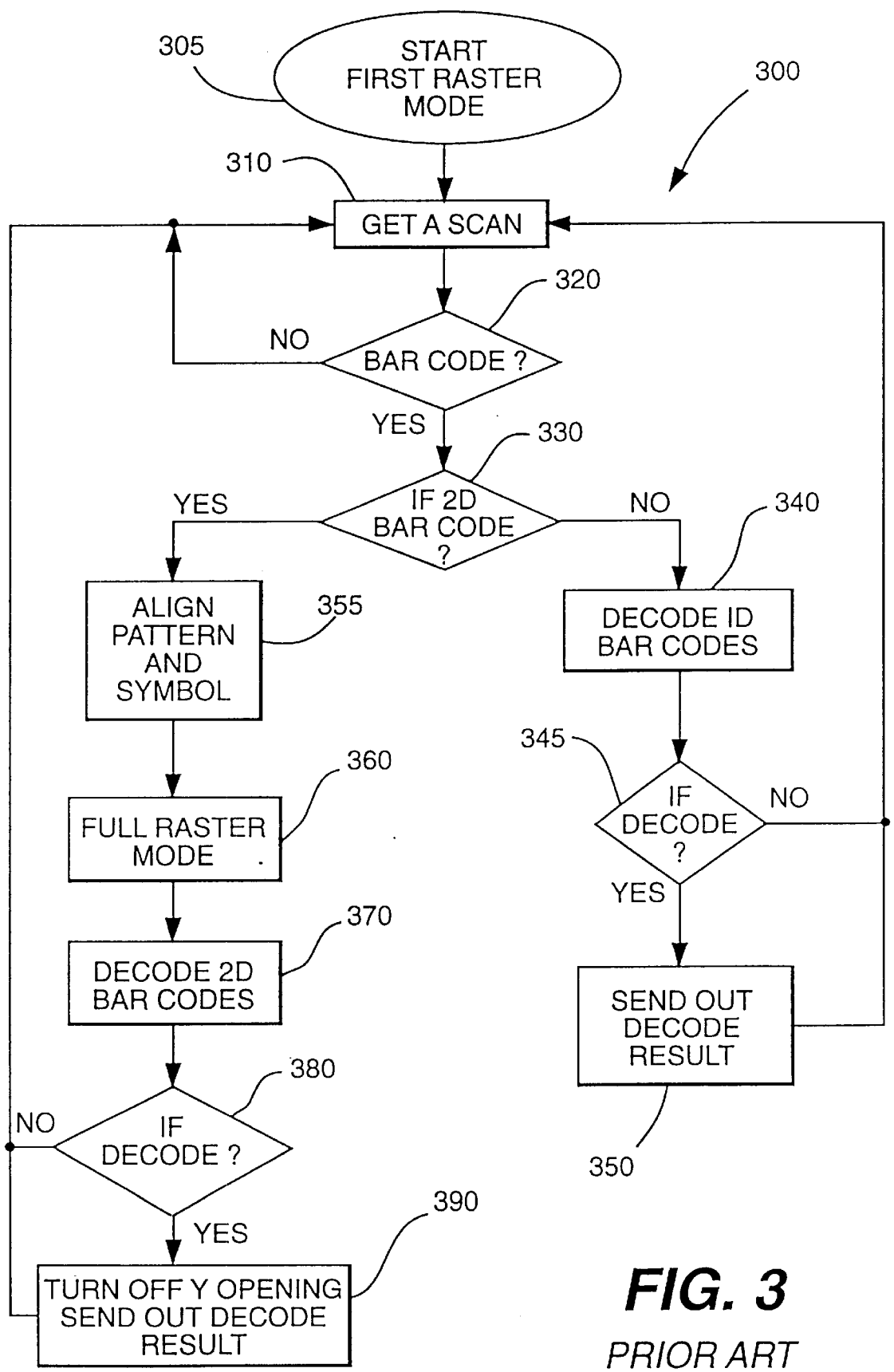
FIG. 3 is a flow chart of the preferred procedure for finding, identifying, and decoding bar codes according to this invention.

FIG. 3 is a flow chart 300 indicating the preferred procedure for finding, identifying, and decoding bar codes. First, scanner 100 generates a narrow (i.e., small vertical displacement) scanning pattern (Step 305), and then scanner 100 takes an initial scan. (Step 310)

In the preferred embodiment, the user presses trigger 154 to begin this scanning operation. Pressing the trigger causes scanner 100 to produce a narrow scanning pattern which is easy for a user to aim and direct toward a target.

Figures 4A, 4B:
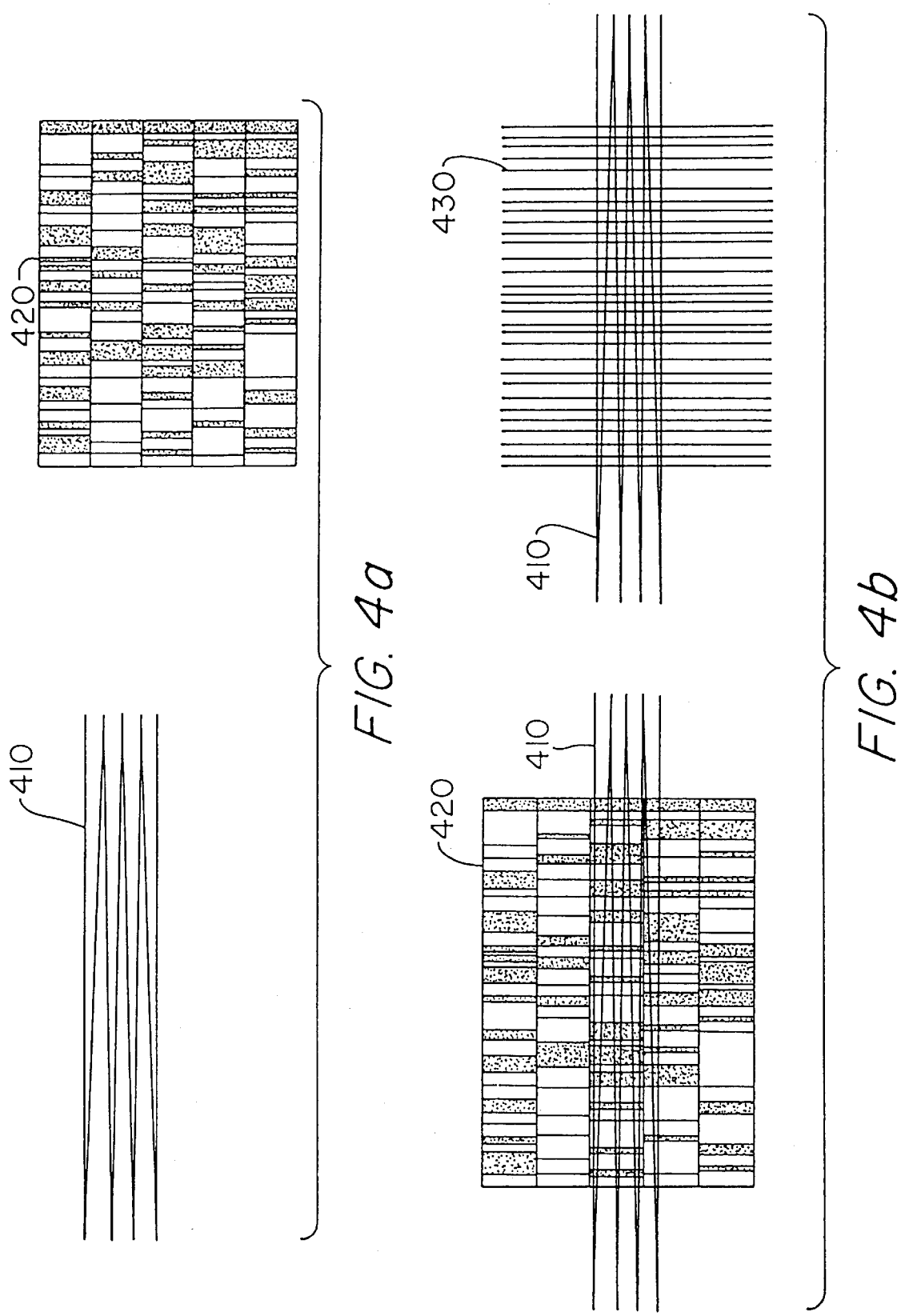
FIGS. 4a–4d are representations of raster scanning beams and bar codes.

FIGS. 4a–4d show a sequence of views of a target and a raster scanning pattern. FIG. 4a is a highly simplified schematic representation of the initial stage of operation when scanner 100 has generated the narrow scanning pattern 410, but the user has not yet properly placed pattern 410 at target bar code symbol 420.

FIG. 4b shows the next stage of the operation, when user has properly placed the narrow scanning pattern 410 over two-dimensional bar code 420 (or one-dimensional bar code 430). Of course, FIG. 4b assumes the target is a bar code. The target could also be some other mark, in which case the system remains in the initial scan mode. (Step 310)

Once the scanning pattern is properly placed over the target, scanner 100 ensures that the scanned target is a bar code symbol. (Step 320) There are several conventional techniques for making this determination. These techniques are not the exclusive methods for distinguishing bar codes, nor are they mutually exclusive. One or more techniques may be used together.

One technique involves analyzing the spatial variation of the areas of different light reflectivity to determine whether the reflected light has characteristics expected from a bar code symbol. Signal processing and control circuitry 165 would typically be programmed to perform these analyses.

A second technique compares the length of the portions of low light reflectivity to those of high reflectivity. If the ratio of those lengths, is within a preset range, the system determines that it has found a bar code.

A third technique counts the number of transitions in a given time period between portions of different light reflectivity. That count can characterize the reflected light as some predetermined pattern, such as a generic bar code symbol, a class of bar code symbols, or even a specific bar code symbol.

A fourth technique compares the electrical signals generated from one scan with that from one or more subsequent scans. If the successive scans yield identical or nearly identical signals, the system concludes that it is viewing a bar code with bars and spaces of uniform widths. A variation of this technique compares several scans to determine whether successive scans differ, but have similar groupings. If so, the target is likely a two-dimensional bar code.

A fifth technique is to try to decode the scans. If the decode is not successful, the system concludes that the target is not a recognizable bar code.

If the target is not a bar code symbol, the system remains in the initial scan mode. (Step 310) At that point, the user may move scanner 100 closer to or farther from the target to account for the possibility that the target lay outside the working range of scanner 100. The user can also seek a new target.

If the target is a bar code symbol (Step 320), scanner 100 tries to determine whether the bar code is one-dimensional or two-dimensional. (Step 330) There are several ways to make this determination as well. One way is to try to decode a row and make the determination on the basis of the decoded information. Another way is to use an intelligent sensing algorithm, such as attempting a decode, to determine whether the sensed portion is from a one-dimensional or a two-dimensional bar code.

In addition, although flow chart 300 shows that the determination of whether a target is a bar code is separate from the determination of the bar code's type, the operations need not be separate. For example, both determinations may take place during the same operation.

After determining the type of bar code, the scanner follows different paths for decoding the bar code. If the symbol is in a one-dimensional bar code, the scanning is virtually complete. Scanner 100 attempts to decode the code without altering the height or width of the scanning pattern. (Step 340) If scanner 100 is successful (Step 345), it sends the decoded data out for further processing. (Step 350) If not, scanner 100 takes additional scans (Step 310) until it successfully decodes the symbol. (Step 345) Scanner 100 may also be programmed to stop after too many unsuccessful decodes or after too much time has passed.

If the symbol is in a two-dimensional bar code (Step 330), additional scanning must take place. First, scanner 100 must make sure the scanning pattern is properly aligned with the bar code. (Step 355).

Figure 5:
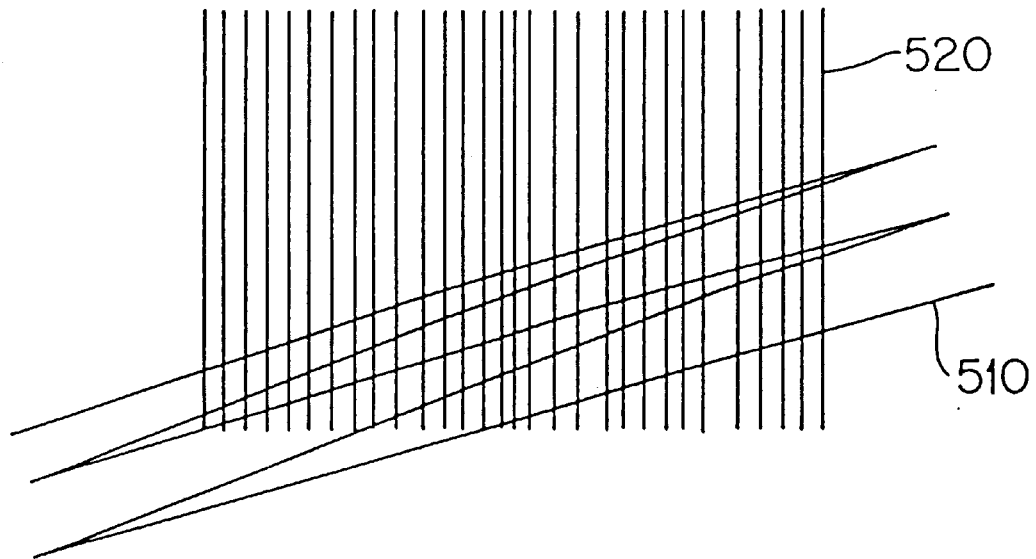
FIG. 5 shows a raster scanning pattern traversing a one-dimensional bar code that is skewed with respect to the scanning pattern.

Orientation is not a problem for one-dimensional bar codes. FIG. 5 depicts the raster scanning pattern 510 traversing a one-dimensional bar code 520 skewed with respect to the direction of the scan lines. The scan lines of a pattern do not need to be orthogonal to a one-dimensional bar code's vertical bars because one or more of the scan lines still traverse the same sequence of bars and spaces.

The situation for two-dimensional bar codes is more difficult. FIGS. 6a, 6b, 6c and 6d are pictorial representations of the raster scanning pattern traversing a two-dimensional bar code 600 originally skewed with respect to the scanning pattern.

Figure 6B:
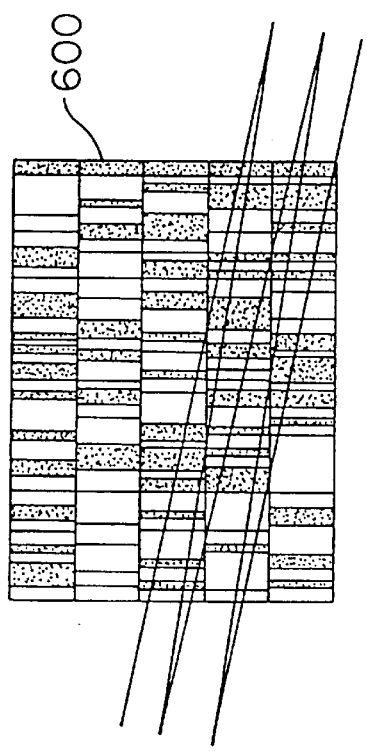
FIGS. 6a–6d are representations of a raster scanning pattern traversing a two-dimensional bar code that is initially skewed with respect to the scanning pattern.
Figure 6D:
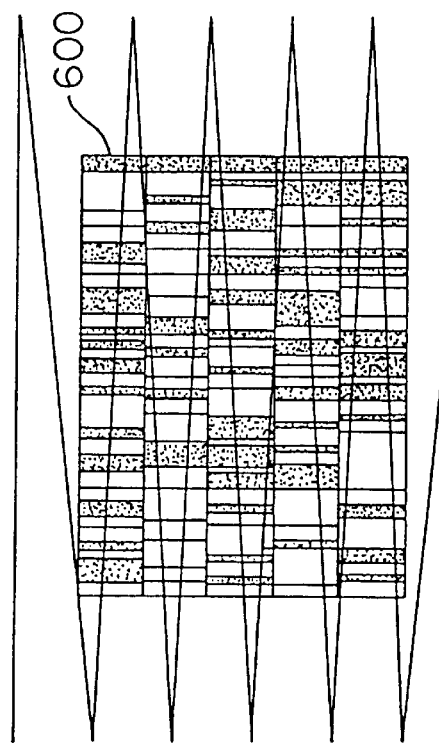
Figure 6A:
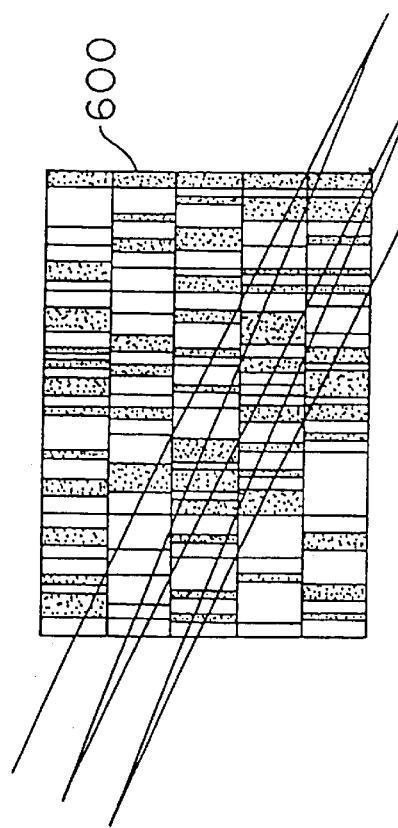

FIG. 6a contains a highly simplified schematic representation of the initial raster scanning pattern skewed or misaligned with respect to two-dimensional bar code 600. Scanner 100 preferably determines this condition by noting when a scan line crosses a row. For example, the PDF417 code uses different codes in different rows (actually there are three different codes that repeat). When the code changes during the decode of a scan line, scanner 100 detects that the scan lines are not aligned.

To read the skewed two-dimensional bar codes, scanner 100 can use several different techniques, such as those described in copending U.S. patent application Ser. No. 317,433, which is herein incorporated by reference. Once scanner 100 determines that the scanning pattern is misaligned, it can begin to reorient, as shown in FIG. 6b.

Figure 6C:
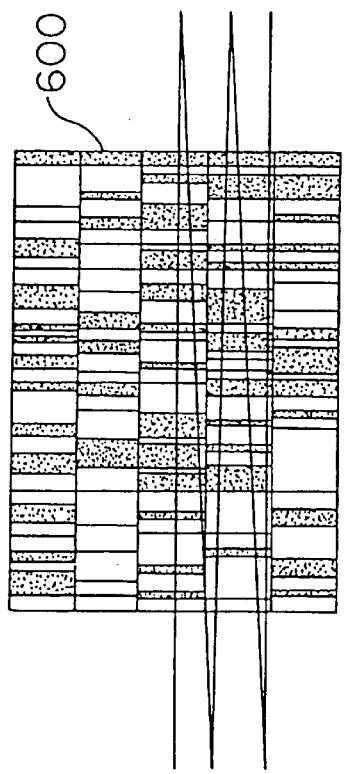

If further analysis reveals that symbol 600 is still skewed relative to the scanning pattern, the system can continue to reorient the scanning pattern until it finally aligns with symbol 600, as shown in FIG. 6c. When reorientation is complete, the entire bar code can be read by using a fully aligned and height-adjusted scanning pattern, as shown in FIG. 6d.

After aligning the scanning pattern with the bar code symbol, scanner 100 enters the full raster mode to increase the height of the scanning pattern. (Step 360) This is done to decode the entire symbol. The term "full raster mode" signifies the process of controlling mirror 159 and motor 160 to change the height, and even width, of the raster scanning pattern. During full raster mode, the pattern height and width usually increase in stages, as FIGS. 4c and 4d demonstrate.

Figure 4C:
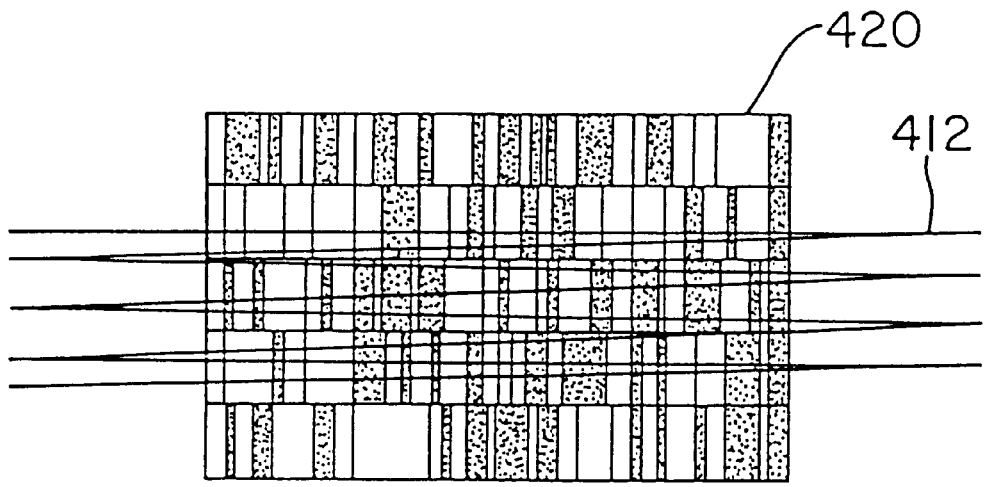

FIG. 4c is a highly simplified schematic representation of a intermediate stage in the operation of scanner 100 during the full raster mode. As the height of the scanning pattern 412 increases, scanner 100 reads the bar code rows covered by the pattern to decode the pattern and to determine when to stop increasing the pattern height. This continues until the entire symbol is read.

Figure 4D:
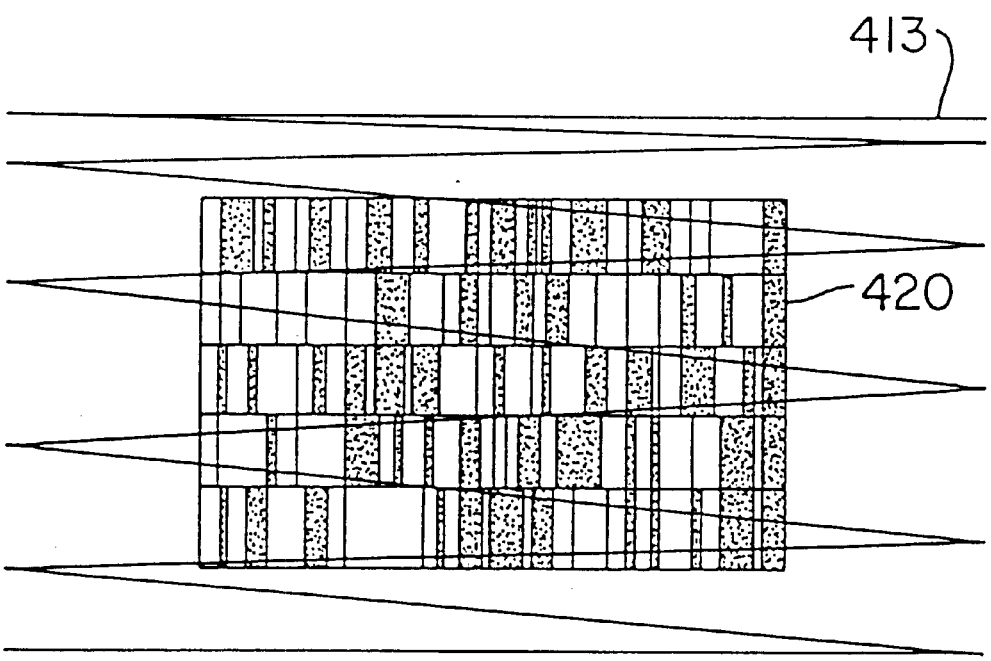

FIG. 4d is a highly simplified schematic representation of the final stage of operation. At this point, scanning pattern 413 covers the entire bar code 420 as well as areas outside of the code 420.

When scanning in the full raster mode, the pattern height increases but the number of scan lines that sweep the bar code symbol does not change. Instead, the height and width of the scan pattern increase, and the angles between adjoining scan lines also increase as FIGS. 4b–4d show. The most effective alignment of the laser scan pattern occurs when each scan line crosses exactly one row in the two-dimensional symbol.

Once the size of the pattern is set (and, preferably, as the size is increasing), scanner 100 decodes the two-dimensional symbol. (Step 370) If scanner 100 successfully decodes the symbol (Step 380), it transmits the decoded data and either narrows the scanning beam or turns it off. (Step 390) If scanner 100 does not successfully decode the symbol (Step 380), scanner 100 continues scanning until it achieves a successful decode or until a predetermined amount of time has elapsed. The predetermined amount of time is typically on the order of three seconds, which is regarded as sufficient time for an operator to sight a symbol and obtain a successful decode.

2. Scanning Height Adjustment

One drawback to the operation just described is that in full raster mode, the pattern will sometimes cover more than just the target bar code. For example, FIGS. 4d and 6d show several scan lines extending beyond the top and bottom edges of the two-dimensional symbol. This unnecessary scanning slows the entire scanning procedure. To solve this problem, the present invention minimizes the amount a given pattern extends beyond a symbol and decreases the scan time by limiting the area of a bar code symbol and surrounding area covered by the scan pattern.

There are at least two techniques to accomplish this goal. The first technique works for codes such as the PDF417 code that embed information about the size of the symbol in the rows of the code. The second technique works for other types of codes.

a. PDF417 mode

For codes such as the PDF417 code, information acquired from the initial scan pattern allows the system to determine the number of rows of the symbol above and below the initial scan pattern in the second stage. This allows the system to find an appropriate new scan pattern and control the rate of opening the scan angle to reach the new pattern, and send the proper control signals to the scanner.

Figure 7:
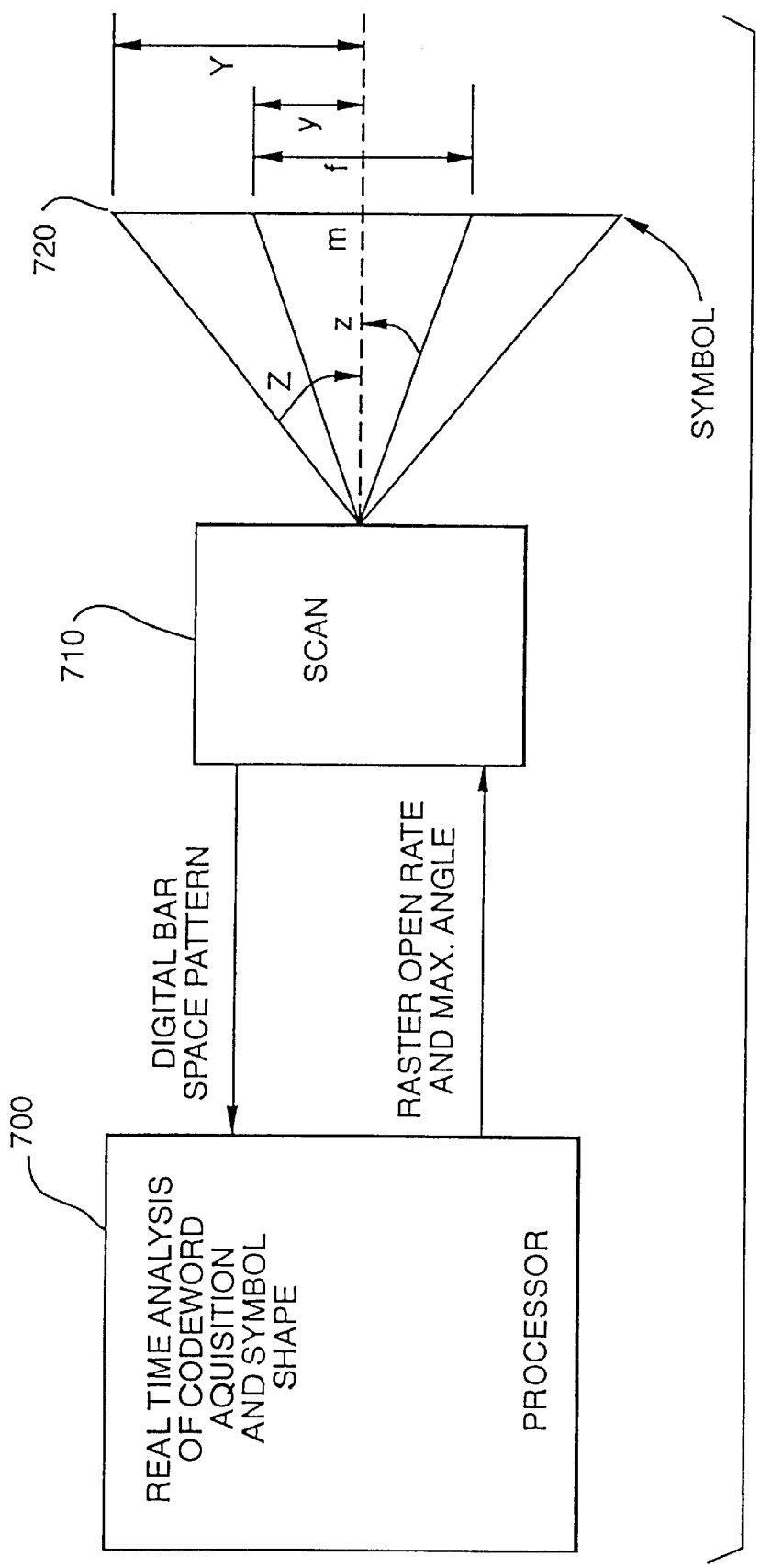
FIG. 7 is a high level diagram showing raster pattern control according to this invention.
Figure 30:
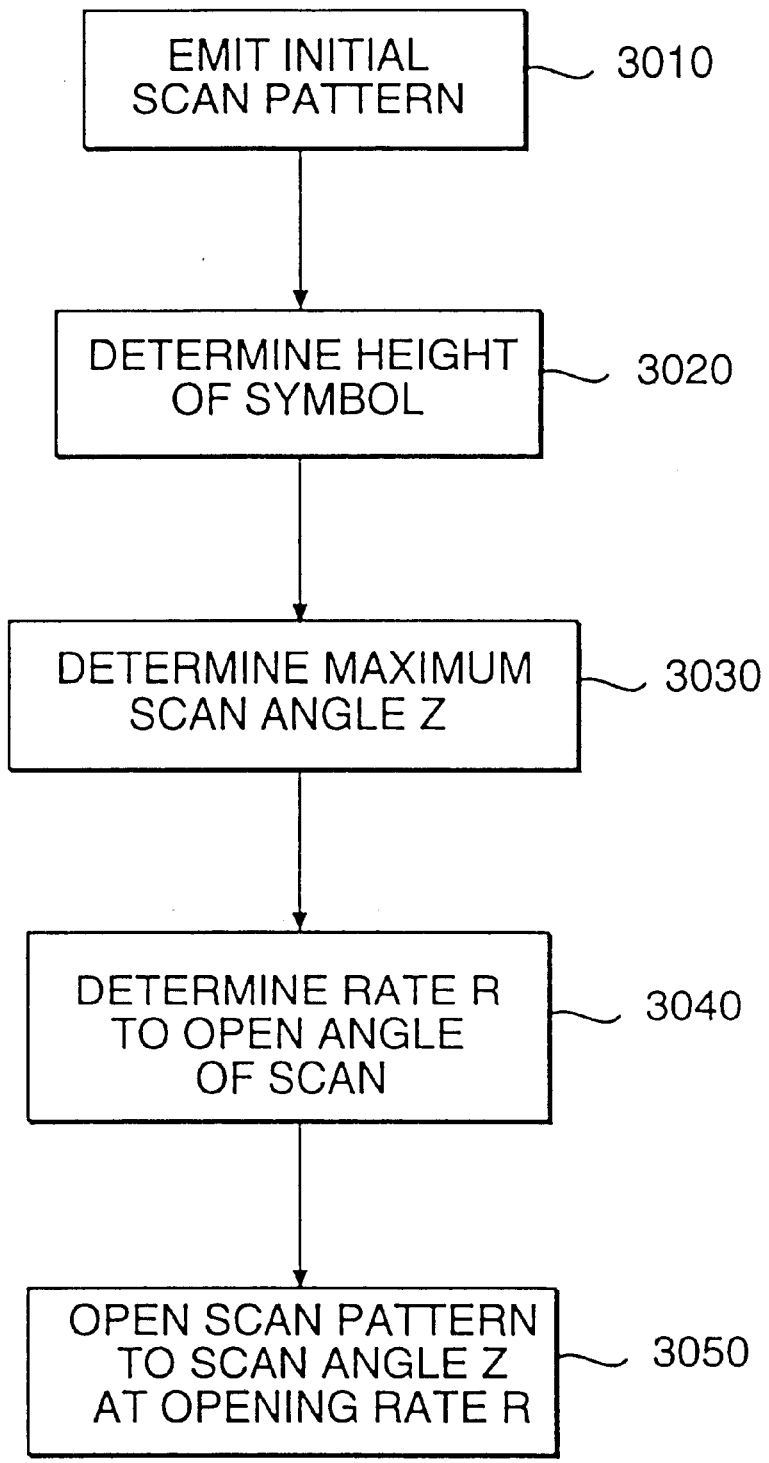
FIG. 30 shows a flow chart for raster pattern control of a two-dimensional stacked bar code.

FIG. 7 is a high level diagram showing raster pattern control according to this invention. FIG. 30 is a flow chart for raser pattern control of a two-dimensional stacked bar code, for example, a PDF417 code. A raster pattern control processor 700, which can be part of control circuitry 165, controls a scan engine 710, which can also be part of circuitry 165, to read symbol 720, shown by a side view. Scan engine 710, located a distance d (not shown) from symbol 720, emits an initial raster scan pattern open to a vertical angle z, as shown in step 3010 of FIG. 30.

When the raster control processor decodes the result of the scan at angle z, it determines that the initial scan pattern crosses f rows of the two-dimensional symbol. If the scan pattern is centered, the number of rows crossed above the middle row m of the pattern is y, which equals f/2.

Next, information regarding the height of symbol 720 is determined, as shown in step 3020 of FIG. 30. The raster control processor 700 decodes information acquired from the initial scan of symbol 720 to determine one-half of the maximum number of rows, Y, of the entire symbol 720. If the bar code is encoded in the PDF417 format, the first two columns in each row contain information about the height of the entire symbol.

From this information, processor 700 can determine the scan angle Z required to read the entire symbol 720 without reading areas above or below symbol 720, as shown in step 3030 of FIG. 30. This can be done as follows:

$$d = y/(\tan(z));$$

$$Z = \tan^{-1}(Y/d), \text{ or } \tan^{-1}((Y/y)*\tan(z)).$$

From this value of Z, processor 700 determines the rate R to open the angle of scan to the angle Z, as shown in step 3040. The rate R is important because processor 700 is preferably decoding symbol 720 as the pattern expands, and the rate of expansion must accommodate this operation. For example, if symbol 720 is large, the rate should be low. If symbol 720 is small, the rate should be fast. Another reason for controlling the rate of the y-direction expansion is that the scanner decodes as it expands.

As the scanning pattern expands in the full raster mode, the scanned data is most useful at the top and bottom of the pattern because the scanner has already read the center areas of the bar code.

To determine the rate R of y-direction expansion, processor 700 first finds the angle differential a as $$a = Z - z.$$

Then, raster control processor 700 determines the rate R as follows:

$$R = a/(r*Y),$$

where r is the time scan engine requires to read a single row.

Control processor 700 then sends commands to scan engine 710 to direct it to open to a maximum scan angle Z at a rate R, as shown in step 3050 of FIG. 30. A preferred implementation of this communication is explained below in the section entitled "Scan engine interface."

In response to the commands, scan engine 710 opens the scan pattern to angle Z to include all of the rows of the symbol 720 without including areas above and below the symbol. This saves scanning time.

Figure 8:
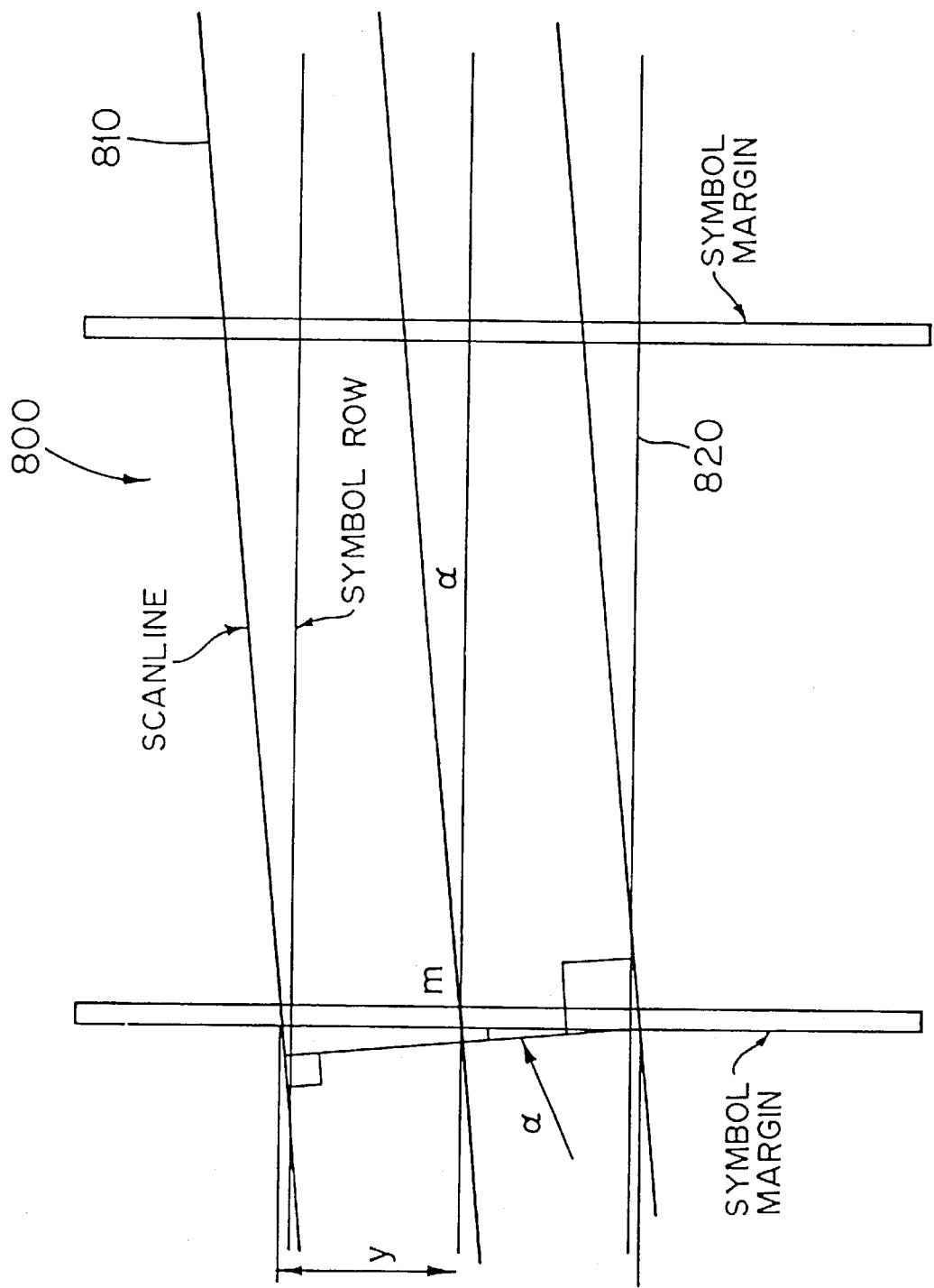
FIG. 8 is a front view of an outline of a symbol that is skewed with respect to the scanning pattern.

This procedure for accelerating scanning applies even when the initial scan pattern is skewed relative to the symbol, which is typical. FIG. 8 shows a front view of the outline of a symbol 800 with portions omitted for clarity. In FIG. 8, the initial scan lines 810 are skewed from rows 820 of symbol 800 by an angle .

The formula for determining the maximum scan angle Z and the opening rate R when there is no skew angle also works when there is a skew angle because the effect of the skew angle cancels out. Although a nonzero skew angle will increase y, the number of rows initially scanned above the middle row m, by a factor of cos , the maximum number of rows Y decreases by the same factor. These two effects cancel out.

The procedure described with regard to FIG. 7 assumes that the user has positioned the scan line approximately at the vertical midpoint of the bar code. If the user does not accurately position the scan line at the midpoint, processor 700 will know this from information in the PDF417 code. The code in each row contains information about the row's number, which processor 700 can use to make corrections as appropriate.

b. Alternative Mode

Figure 9:
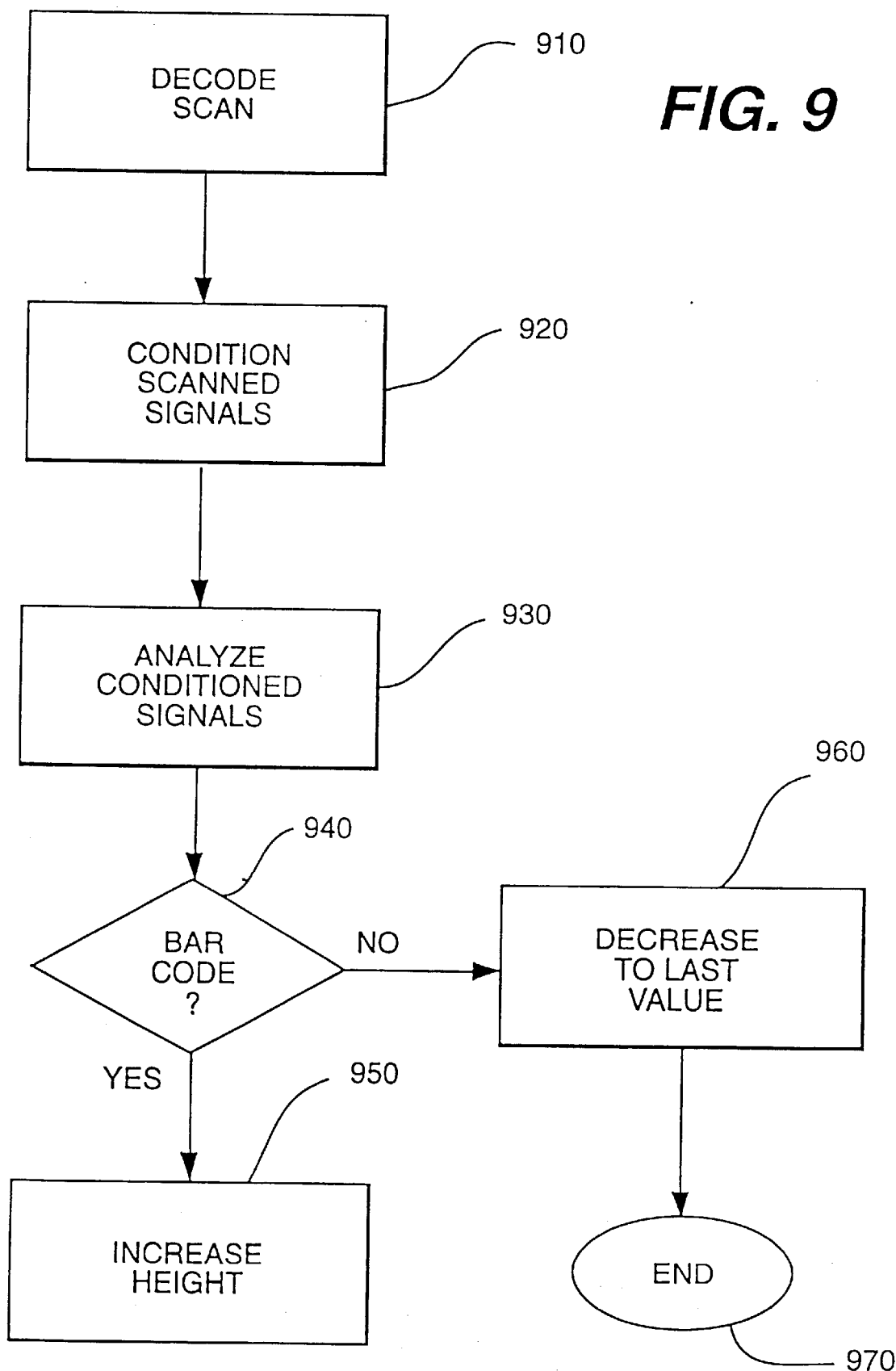
FIG. 9 is a flow chart of a procedure for implementing a full raster scan of a two-dimensional symbol.
Figure 10:
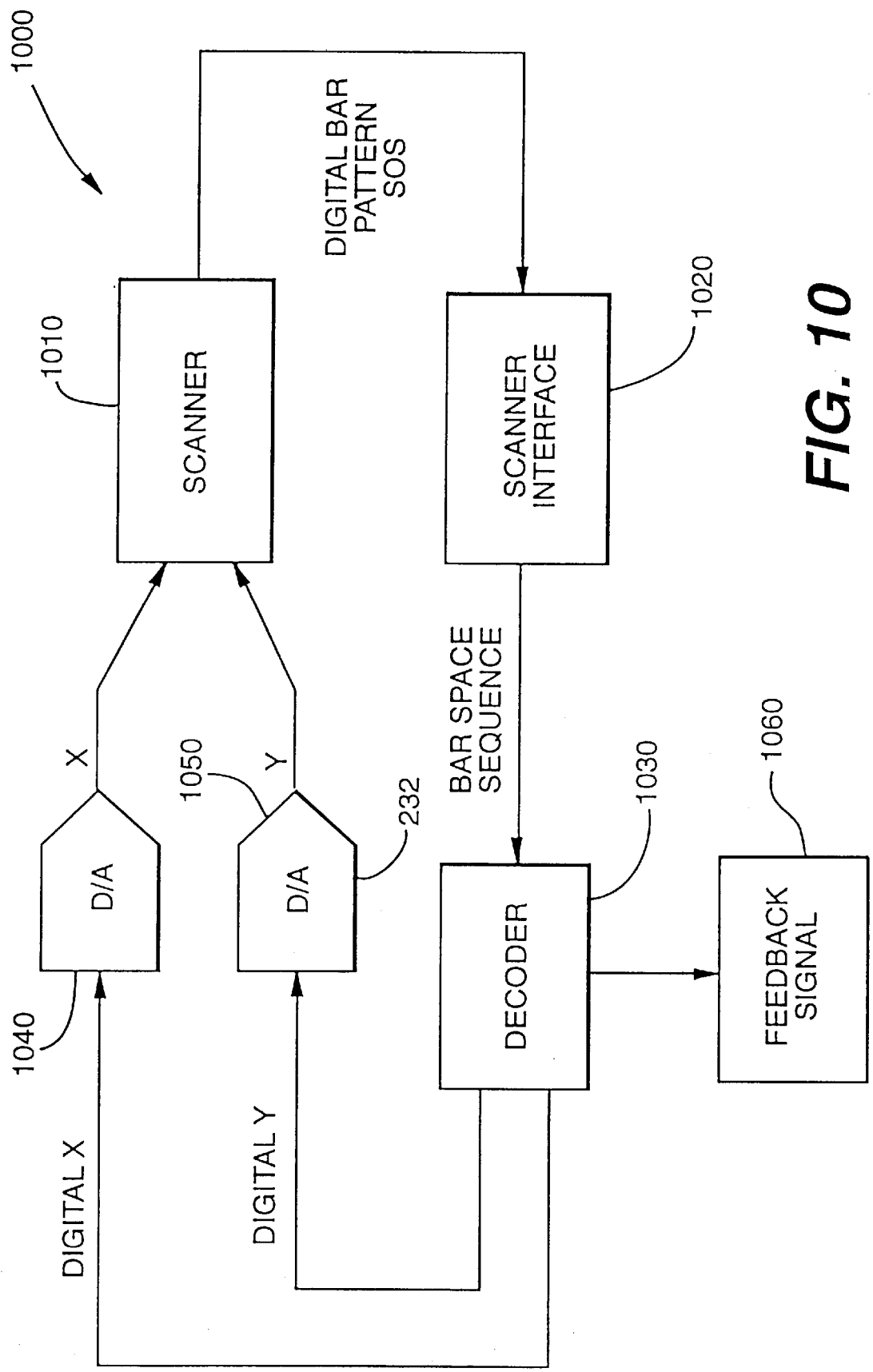
FIG. 10 is a block diagram of a scanning system showing the control of a scanner in a full raster mode.

If the two-dimensional bar code symbol does not have embedded information to allow the procedure described in relationship to FIGS. 7 and 8, the present invention contemplates a different procedure shown in FIG. 9 and using the scanning system 1000 shown in FIG. 10. FIG. 10 depicts the control of scanner 1010 in the full raster mode.

Flow chart 900 in FIG. 9 begins by decoding a scan. (Step 910) This is done by having scanner 1010 begin a raster pattern across a bar code symbol and receive the reflected light from the symbol. From that reflected light, scanner 1010 generates electrical signals representing the widths of the bar and space pattern.

Actually, scanner 1010 sends two types of signals: the Start of Scan (SOS) and Digital Bar/space Pattern (DBP). The SOS signal is a square waveform which changes levels at the start of each scan, so it is a logical 0 for scans in one direction and a logical 1 for scans in the other direction. The DBP signal is a digital waveform consisting of logical 1 and logical 0 pulses whose durations represent the widths of the bar and space pattern of the bar code being scanned.

Next, the scanned signals are conditioned. (Step 920) FIG. 10 actually shows this step as occurring in two smaller steps. First, scanner interface 1020 measures the durations of each pulse by counting the number of pulses of a timer that occur during each bar and space.

Scanner interface 1020 then records those values (DBP counts) for each bar or space, and uses the SOS signal to group the DBP counts for each scan. Scanner interface 1020 sends these grouped counts to decoder/scan control 1030 as a Bar Space Sequence.

Next, the conditioned signals are analyzed to determine whether they represent bar code information or some other type of information. (Step 930) In the embodiment shown in FIG. 10, decoder/scan control 1030 makes this determination by looking at the DBP counts. For example, a large DBP count indicates a white or black space that is too large to be a bar or space in a bar code symbol. Alternatively, decoder/scan control 1030 may sense that the number of elements in one scan symbol differs greatly from the number of elements determined from scans taken inside the symbol. Other techniques are possible as well. For example, the inability of the decoder/scan control to recognize any characters might indicate that the current scan did not cross the bar code.

If the conditioned signals represent a bar code pattern (Step 940), then the scanning pattern increases (Step 950), and the process repeats. If not, the pattern is reduced to its previous value (Step 960) and raster mode is finished. (Step 970)

In FIG. 10, decoder/scan control 1030 determines whether scanner 1010 must enlarge or reduce the raster pattern. To change the size of the raster pattern, decoder/scan control 1030 sends digital control signals to digital-to-analog converters 1040 and 1050 to provide the X and Y driving signals, respectively, for scanner 1010.

Instead of simply causing the D/A converters 1040 and 1050 to change voltages, system 1000 can use more sophisticated control techniques to provide for better control over the behavior of the scanner raster pattern. Some of these are described below in the section entitled "Scanning Control."

There is a note of caution, however. Any technique to control the raster pattern should have parameters that can be tied to the mechanical properties of the scanner. These parameters allow for a smoother change in the size of the raster pattern, and the proper rate of change enables the scanner 1010 to respond smoothly to the voltage changes received from the decoder/scan control 1030. The proper rate and smoothness of change can eliminate the flicker that annoys some users.

The length of the scan and the rate at which it is adjusted depend on the amount of white space in the scan data before and after useful bar code data is decoded. Decoder/scan control 1030 can determine how much the raster has exceeded the edge of the bar code symbol in the y-direction by counting the number of scans from which no data can be decoded. For example, a large white space can be detected by observing a large DBP count. The scanner 1010 then makes adjustments, as described above, based on the data values received.

Although the size of scanning patterns can adapt to changes in the distance between the scanner and the bar codes, the change in size should not take place too quickly. The rate of y-direction expansion should depend on the number of rows in a label and the label's height.

To teach the scanner operator the correct range and orientation of the scanner in order to read symbols quickly and accurately, a feedback signal 1060 (an audible "beep" or a visual indicator) may be used when a symbol is detected in range. FIG. 10 shows this signal 1060 as connected to decoder/scan control 1030. In one embodiment, an LED blinks slowly when there is poor alignment and accelerates proportionately as the alignment improves.

3. Bar Code Detection and Identification Circuitry

Figure 11:
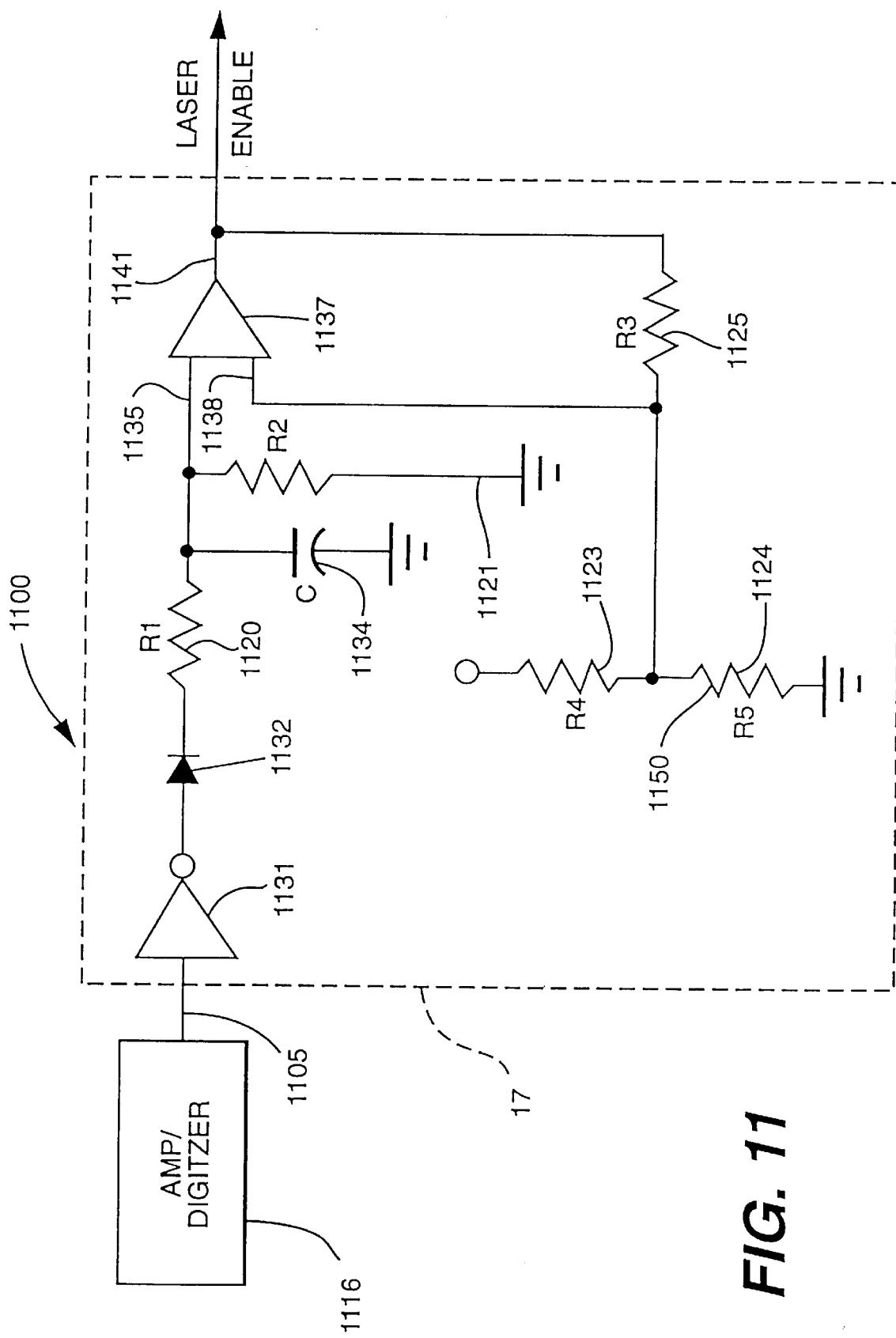
FIG. 11 is a diagram of a circuit to determine whether a scanned target is a bar code.

One of the key steps in flow chart 300 shown in FIG. 3 is to determine whether the scanned target was a bar code. Although there are several ways to make this determination, FIG. 11 shows a diagram of a circuit 1100 to do so. This circuit is also disclosed in parent application Ser. No. 506,674.

Circuit 1100 receives a signal 1105 from amplifier/digitizer 1116, and that signal enters the input of an inverter 1131. The output of inverter 1131 connects to the anode of a diode 1132, and the cathode of diode 1132 connects to an RC circuit formed by resistor 1120 connected in series with a parallel circuit of resistor 1121 and capacitor 1134. Diode 1132 prevents capacitor 1134 from discharging into the output of inverter 1131.

Resistor 1121 and capacitor 1134 also connect between a ground potential and one input 1135 of an open collector output comparator 1137. The second input 1138 of comparator 1137 is a threshold level. That threshold level is also the potential of an intermediate node of a voltage divider formed by the series connection of resistors 1123 and 1124 between supply voltage V and ground.

The output of comparator 1137 is a "laser enable" signal 1141 that indicates the target is a bar code. Comparator 1137's output also feeds back to the voltage divider's intermediate node 1150, and thus to input 1138, via resistor 1125, which has a value R3. This feedback provides a hysteresis effect to the comparison operation.

As FIG. 11 shows, resistor 1120 has a value R1, resistor 1121 has a value R2, resistor 1123 has a value R4, resistor 1124 has a value R5, and capacitor 1134 has a value C. R2 is much larger than R1.

Circuit 1100 actually examines the lengths of different portions of signal 1105. When that signal is low, indicating the presence of a bar, the output of inverter 1131 is high and charges capacitor 1134 with a time constant of approximately R1*C, since R2 is so much larger than R1.

For a space, signal 1105 is high and thus the output of amplifier 1131 is low. This discharges capacitor 1134 through resistor 1121 since the diode 1132 prevents discharging through resistor 1120. The time constant R2*C is much greater than the time constant R1*C, so the circuit requires a longer space to cancel the effect of a bar.

After the circuit 1100 examines several bars and spaces from a bar code having a typical density, capacitor 1134 develops a voltage that exceeds the threshold level of comparator 1137. This activates laser enable signal 1141.

This activation also drives the open collector output of comparator 1137 low, dropping the threshold voltage at input 1138. This behavior causes hysteresis to prevent minor voltage changes on capacitor 1134 by bars, spaces, and quiet zones from disabling laser enable signal 1141.

It might appear as if circuit 1100 would also trigger if amplifier/digitizer 1116 produced a detected signal representing a long black bar. This is not a problem, however, because in the preferred embodiment, amplifier/digitizer 1116 functions as a high pass filter to prevent generating long signals. For example, amplifier/digitizer circuit 1116 could produce only short pulses of known durations for black bars, so the signal for a long black bar would be the same as a shorter one.

Circuit 1100 is sufficiently flexible to be used, along with software executed by CPU 140 (FIG. 1) for other purposes. For example, circuit 1100 can help discriminate a bar code from text or other graphics. To do so, circuit 1100 and CPU 140 exploit the uniform width of bar codes as compared to text which has differing widths. Because of this characteristic, different scans through different slices of a bar code pattern will likely yield similar results. On the other hand, different scans through different portions of text will yield different results. Scan lines spaced sufficiently close together may even be used to distinguish two-dimensional bar codes from graphics because of the uniform width of the bars and spaces in two-dimensional bar codes.

A raster scan pattern works well with this technique by automatically moving the scans perpendicularly. This guarantees that successive scan lines cross parallel slices of the scanned pattern.

Furthermore, greater accuracy may be obtained by controlling certain operational parameters, such as horizontal and vertical scan angles, in response to the type of bar code determined to be scanned. This is useful for a single system to decode both one-dimensional and two-dimensional bar codes.

Scanning according to this invention is not limited to raster-type scanning. Individual control of X-axis and Y-axis allows the system to provide a scan pattern of any desired shape. For example, using only the X-axis controls generates a linear scan line at the symbol. Driving the X-axis and Y-axis controls at uniform rates of speed causes a raster-type scan pattern having a set of generally parallel scan lines. Driving the X-axis and Y-axis scans at sinusoidally varying rates generates an omnidirectional Lissajous-type scan pattern.

Information on scanning control may be found in U.S. Pat. No. 4,387,297, as well as U.S. patent application Ser. No. 520,464, filed May 8, 1990, which is also incorporated herein by reference.

One last advantage of using the circuitry in FIG. 11 arises from the signal processing it performs without using other scanner resources. This technique reduces the amount of processing CPU 140 must perform, and thus reduces the system's latency when reading a bar code symbol.

C. Scanning Control

1. Scanning Element Control

Figure 12:
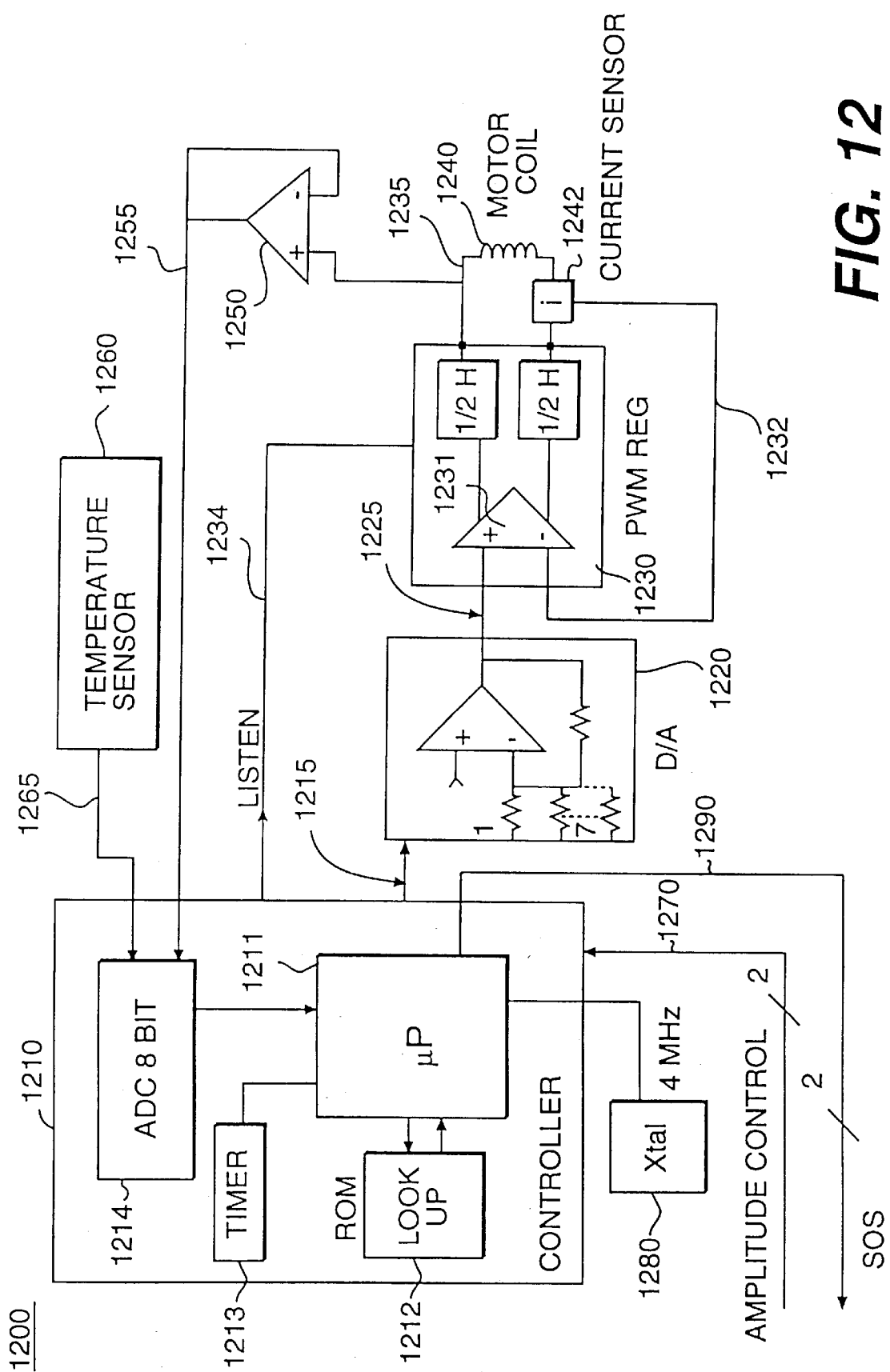
FIG. 12 is a block diagram of a scan engine.

FIG. 12 shows the details of a scan engine 1200 in accordance with this invention that is both flexible and efficient. Scan engine 1200 can be used with the scanner subsystems described in this specification or with different subsystems.

As FIG. 12 shows, scan engine 1200 has three major components: controller 1210, digital-to-analog (D/A) converter 1220, and PWM regulator 1230. PWM regulator 1230 controls a motor coil 1240 that drives a scanning element (not shown) and provides feedback to controller 1210 via amplifier 1250.

Controller 1210, which is preferably a PIC16C71 manufactured by Microchip Technology, Inc., forms and sends a digital drive signal 1215 to D/A converter 1220. Digital drive signal 1215 is actually a series of 7-bit digital numbers corresponding to voltage values of a signal to drive coil 1240. As explained in greater detail below, digital drive signal 1215 is preferably the sum of two sine waves, one to drive the horizontal or X-axis deflection, and one to drive the vertical or Y-axis deflection.

D/A converter 1220 generates analog linear control voltage signal 1225 from digital drive signal 1215, and provides analog drive signal 1225 as an input to PWM regulator 1230. D/A converter 1220 appears conceptually as a ladder-type converter because such converters can be made very compact. Other converter designs will work as well, however.

PWM regulator 1230, which includes comparator 1231, creates a current drive signal 1235 from analog drive signal 1225, and sends current drive signal 1235 through coil 1240. The shape of current drive signal 1235 resembles that of analog voltage drive signal 1225, so in one sense, PWM regulator 1230 acts as a voltage-to-current converter.

Coil 1240 creates a magnetic field proportional to current drive signal 1235. That magnetic field causes a RASE (Resonant Asymmetric Scan Element) to oscillate horizontally and a mylar support of the RASE to oscillate vertically. In this manner, the RASE and its support act as scanning mirror 159 (FIG. 1) does. The RASE and its support are described in U.S. Pat. No. 5,280,165, which is incorporated herein by reference.

The RASE has a high Q allowing it to continue oscillating even after the driving magnetic field stops. The preferred implementation takes advantage of this feature by periodically stopping the active driving of coil 1240. The RASE continues oscillating, however, and coil 1240 then acts as a passive sensing element picking up information about the amplitude and the phase of the moving RASE.

Amplifier 1250, which is connected as a buffer, converts the signals from coil 1240 to amplitude and phase feedback signal 1255, an input to controller 1210. Controller 1210 uses feedback signal 1255 to ensure that it is properly driving coil 1240.

A temperature sensor 1260 provides a second input, temperature signal 1265, to controller 1210. Signal 1265 represents the ambient temperature proximate to scan engine 1200.

Sensor 1260 measures the ambient temperature for two reasons. One is to calibrate engine 1200 to account for changes due to temperature. The other purpose is to alert controller 1210 to stop operations if the ambient temperature is outside of a safe operating range.

A third input for controller 1210 is the two-wire (clock plus data) serial ZIF interface 1270. As will be explained in greater detail below in the section entitled "Scan engine interface," this interface allows controller 1210 to receive commands from the rest of the scanner and send information to the scanner.

The remaining input to controller 1210 is an external clock 1280. Clock 1280 generates a signal at the frequency required by the preferred embodiment of controller 1210.

In addition to ZIF interface 1270 and digital drive signal 1215, controller 1210 also sends out two other signals. One is a "Listen" signal 1234 to tell PWM regulator 1230 to stop generating current drive signal 1235, thereby turning coil 1240 into a pickup device.

A second signal sent by controller 1210 is the Start of Scan or SOS signal 1290. As explained above, the SOS signal indicates when and in what direction the RASE is being driven horizontally.

In the preferred embodiment, controller 1210 contains a microprocessor 1211, a look up ROM 1212, an internal timer 1213, and an analog-to-digital (A/D) converter 1214. Microprocessor 1211 includes an arithmetic logic unit and internal memory. ROM 1212, which is preferably programmable, provides tables of data and routines to control the operations of microprocessor 1211. Timer 1213 is an interrupt timer that microprocessor 1211 uses to control real-time operations. A/D converter 1214 converts the analog temperature, amplitude, and phase information into a digital format for microprocessor 1211.

When operating in its normal mode, controller 1210 produces seven-bit digital drive signal 1215 representing the sum of two sine waves. One is approximately 290 Hz and the other is approximately 15 Hz. The 290 Hz signal is used to drive the X-axis deflection of the RASE, and the 15 Hz signal is used to drive the Y-axis deflection of the mylar support.

Controller 1210 can change digital drive signal 1215 as needed. For example, controller 1210 constantly monitors feedback signal 1255 to determine whether to change the amplitude or frequency of digital drive signal 1215. In addition, controller 1210 can produce a signal with a different shape or different frequencies to accommodate other equipment.

D/A converter 1220 continuously converts digital drive signal 1215 to analog drive signal 1225. An analog drive signal allows scan engine 1200 to operate accurately at higher frequencies. To understand why requires an understanding of PWM regulator 1230.

PWM regulator 1230 receives analog drive signal 1225 at a non-inverting input of comparator 1231 and receives a current feedback signal 1232 at the inverting input of comparator 1231. Current sensor 1242 generates current feedback signal 1232 as a voltage signal corresponding to current drive signal 1235. Constructing PWM regulator 1230 in this manner forces regulator 1230 to make current drive signal 1235 track analog drive signal 1225.

This design of PWM regulator 1230 has two advantages over a conventional voltage drive circuit. First, voltage drivers require a very large voltage supply to counteract the back end of coil 1240. PWM regulator 1230 does not because it is a current driver.

Second, a voltage driver can reduce the high Q of the RASE by forcing through coil 1240 signals that are not at the coil's resonant frequency. The preferred embodiment of regulator 1230 does not reduce the Q of the RASE because the feedback component ensures that the RASE is driven at the resonant frequency.

Figure 13:
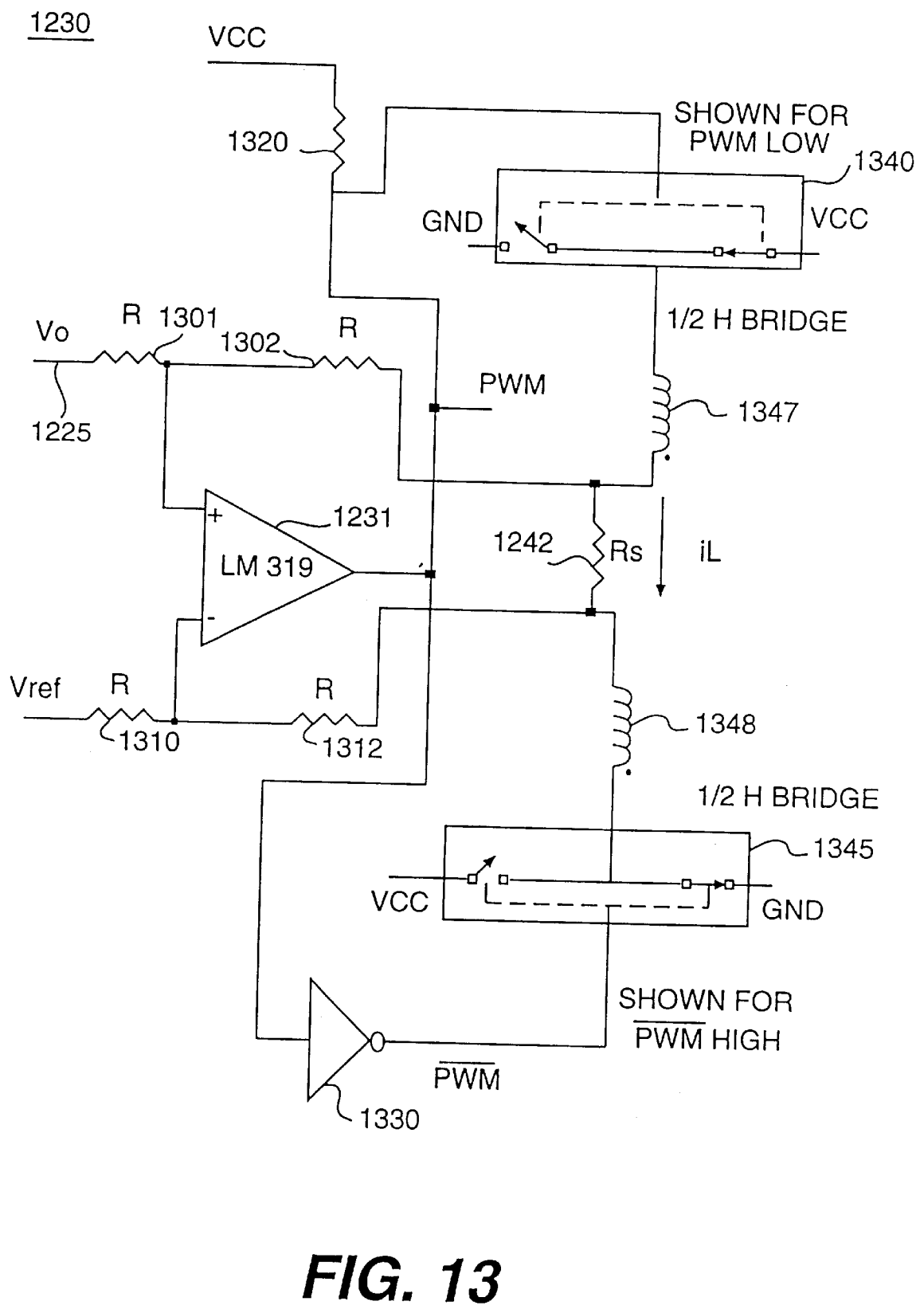

FIG. 13 shows the preferred construction of PWM regulator 1230 in greater detail. Analog drive signal 1225, shown as Vo, enters the non-inverting input of operation comparator 1231 via resistor 1301. The inverting input of comparator 1231 connects to a reference voltage, Vref, via resistor 1310.

The output of open collector comparator 1231, which is pulled up to control voltage Vcc via resistor 1320, produces a PWM signal that inverter 1330 uses to form an inverted PWM signal. The PWM signal controls a switch 1340, and the inverted PWM signal controls a switch 1345. Switches 1340 and 1345 connect to opposite sides of coil 1240 to form a ½H bridge.

Figure 14:
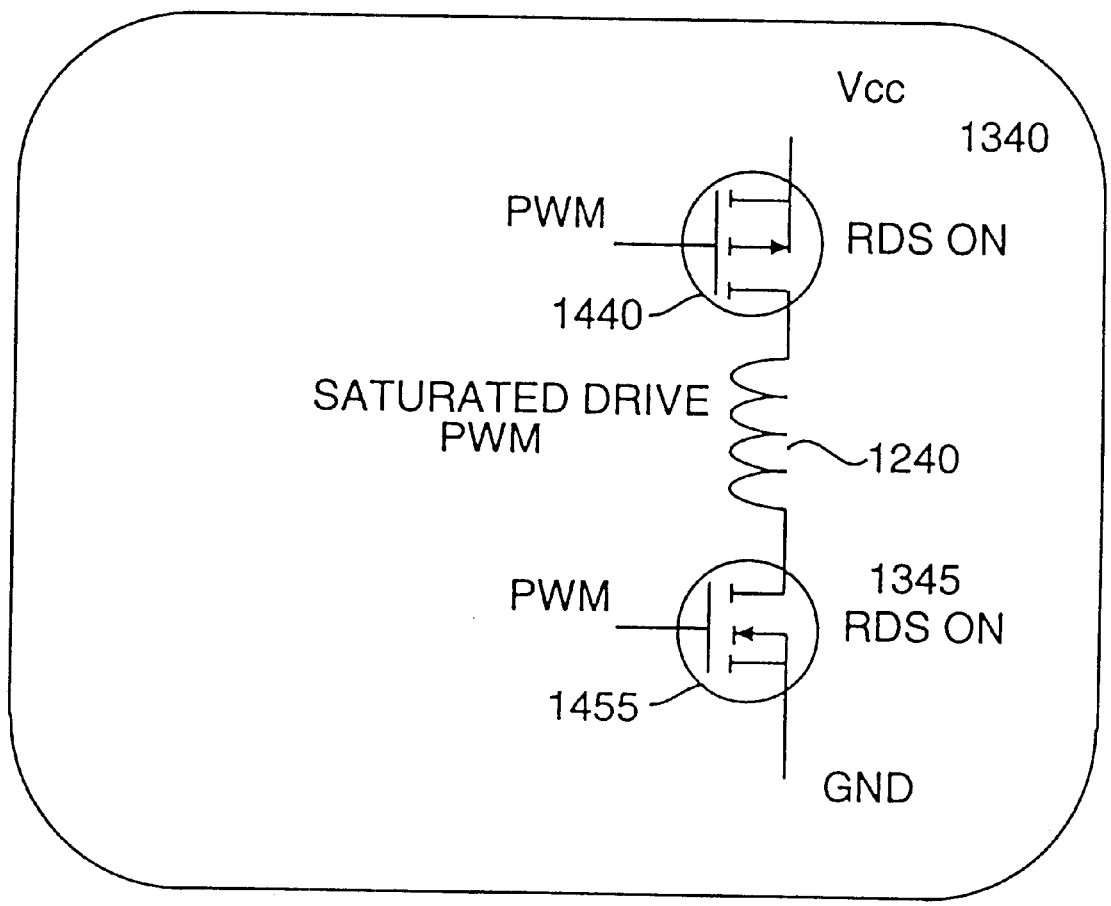
FIG. 14 is a diagram showing switches used in the PWM regulator in FIG. 13.

FIG. 14 shows that switches 1340 and 1345 are preferably transistors 1440 and 1455, respectively. Transistors 1440 and 1455 act as switches because they are in one of two states: saturated or nonconducting. Using transistors in this manner reduces the rds (resistance from drain to source) loss, and is more efficient than using transistors in their active regions as linear drives. The PWM regulator shown in FIGS. 13 and 14 is about twice as efficient as a linear drive. Moreover, this PWM regulator produces a switching frequency greater than 100 KHz, thereby minimizing the switching frequency current components in the motor coil.

Switches 1340 and 1345 alternately switch on and off to create a high-frequency PWM pulse train across coil 1240. The inductance of coil 1240 integrates this pulse train to produce in coil 1240 a piecewise linear current proportional to the D.C. component of the pulse train. This time-varying current approximates the summed sine waveform of analog signal 1225.

FIG. 13 shows that in the preferred embodiment, coil 1240 is split into two serially-connected sections, 1347 and 1348 separated by current sensing resistor Rs 1242. One side of Rs 1242 connects through resistor 1302 to the non-inverting input of amplifier 1231, and the other side of sensing resistor 1242 connects through resistor 1312 to the inverting input of amplifier 1231. The sizes of the resistors are chosen so that the current through coil 1240, $i_L$, approximately equals (Vo-Vref)/Rs.

Coil 1240 generates a magnetic field with the same shape as current drive signal 1235, the sum of the 290 Hz and 15 Hz sine waves. The RASE mechanically filters out the lower frequency portion of the magnetic signal, and the mylar support mechanically filters out the higher frequency portion.

Figure 15A:
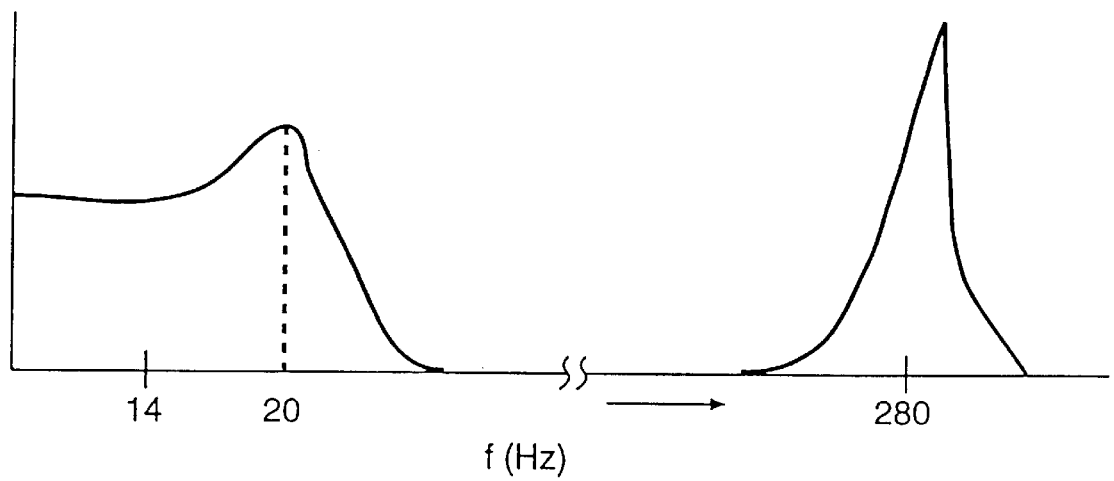
FIG. 15a is a diagram of the frequency response for an RASE and mylar support which can be used with this invention.

FIG. 15a shows the frequency response for the RASE and its mylar support to demonstrate the mechanical filtering. As is apparent, the mylar support will only respond to the lower frequency signals, and the RASE will only respond to signals in a narrow band around 280 Hz.

Figure 15B:
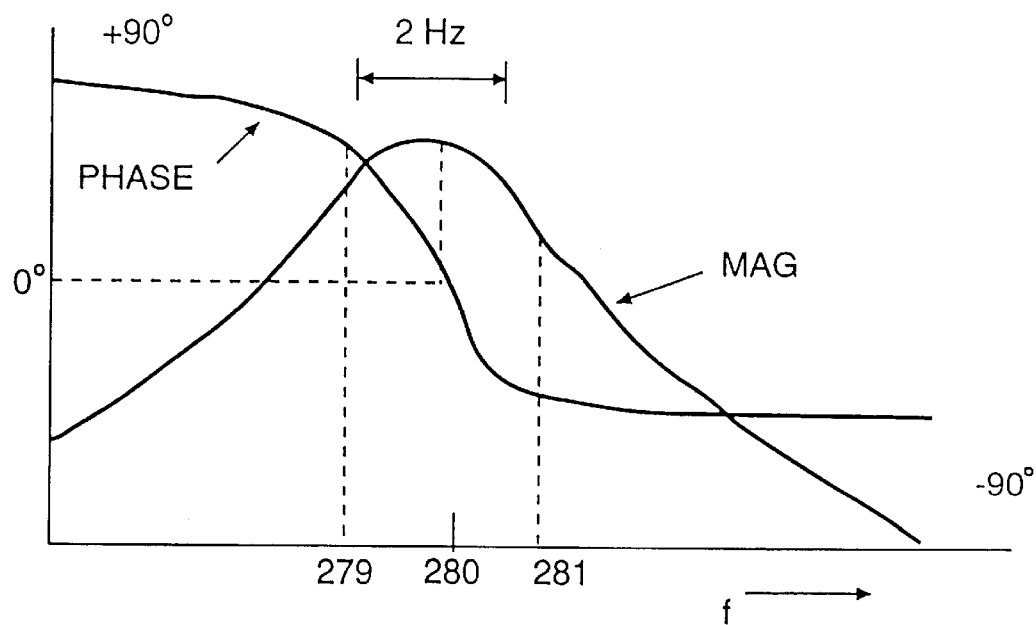
FIG. 15b is a diagram showing the magnitude and phase variations as a function of frequency for the RASE.

FIG. 15b demonstrates the high Q (about 500) of a RASE whose resonant frequency is 280 Hz. The values for the magnitude and phase differ markedly as a function of frequency.

To drive the RASE with such a high Q requires careful feedback monitoring. Microprocessor 1211 performs such monitoring by extracting from the digitized feedback signal maximum amplitude and phase (or frequency) information. The preferred mode for feedback monitoring involves taking periodic measurements at the same relative phase of digital drive signal 1215. In the preferred implementation, microprocessor 1211 takes a feedback measurement once every 19½ cycles of the x-axis drive, and times the measurements to begin at zero-crossing and end at the maximum amplitude or quarter-cycle point. If the measured value differs from the intended value, controller 1210 is out of phase with the RASE, and microprocessor 1211 changes the frequency to correct this condition.

To correct the amplitude and frequency values of signal 1215, microprocessor 1211 uses several values set during calibration at the factory. This is the preferred time to insert baseline values into ROM 1212.

Of course the values stored in ROM 1212 at calibration may not always remain accurate. Changes in temperature, the RASE, or other factors might require microprocessor 1211 to generate different values for driving signal 1215. This is why microprocessor 1211 makes adjustments based on feedback. To make adjustments, microprocessor 1211 obtains from ROM 1212 two sets of amplitude values for X-axis deflection and one frequency (or sine wave period) setting. In the preferred embodiment there is no Y-axis adjustment, just a set of amplitude values for X-axis adjustment. To correct Y-axis deflection, however, ROM 1212 could contain an additional set of amplitude values.

For the X-axis deflection, ROM 1212 includes baseline values representing the maximum deflection, and coarse amplitude adjustment values. The coarse adjustment values are five percent of the corresponding baseline values. In the preferred embodiment, each set of values for the high frequency or X-axis signal has sixteen entries, and each set of values for the low frequency or Y-axis signal has twenty-six entries. In the preferred embodiment, the values represent successive values for sine waves.

The frequency value tells microprocessor 1211 how often to send out new values for the digital drive signal 1215. For example, for a 300 Hz sine wave, microprocessor 1211 would have to send out a complete set of values every 1/300 Hz or 3.33 ms. If a complete set included sixteen values, microprocessor 1211 would need to provide a new value every 3.33 ms/16, or 208 us. Preferably, interrupt timer 1213 is set to the value necessary to generate the digital drive signal 1215 at the desired frequency.

Microprocessor 1211 makes frequency adjustments by loading a new value into interrupt timer 1213. Amplitude adjustments are not very complicated either. Microprocessor 1211 forms new values for signal 1215 by subtracting values using coarse adjustment values from the baseline and then using a fine adjustment technique.

Figure 16:
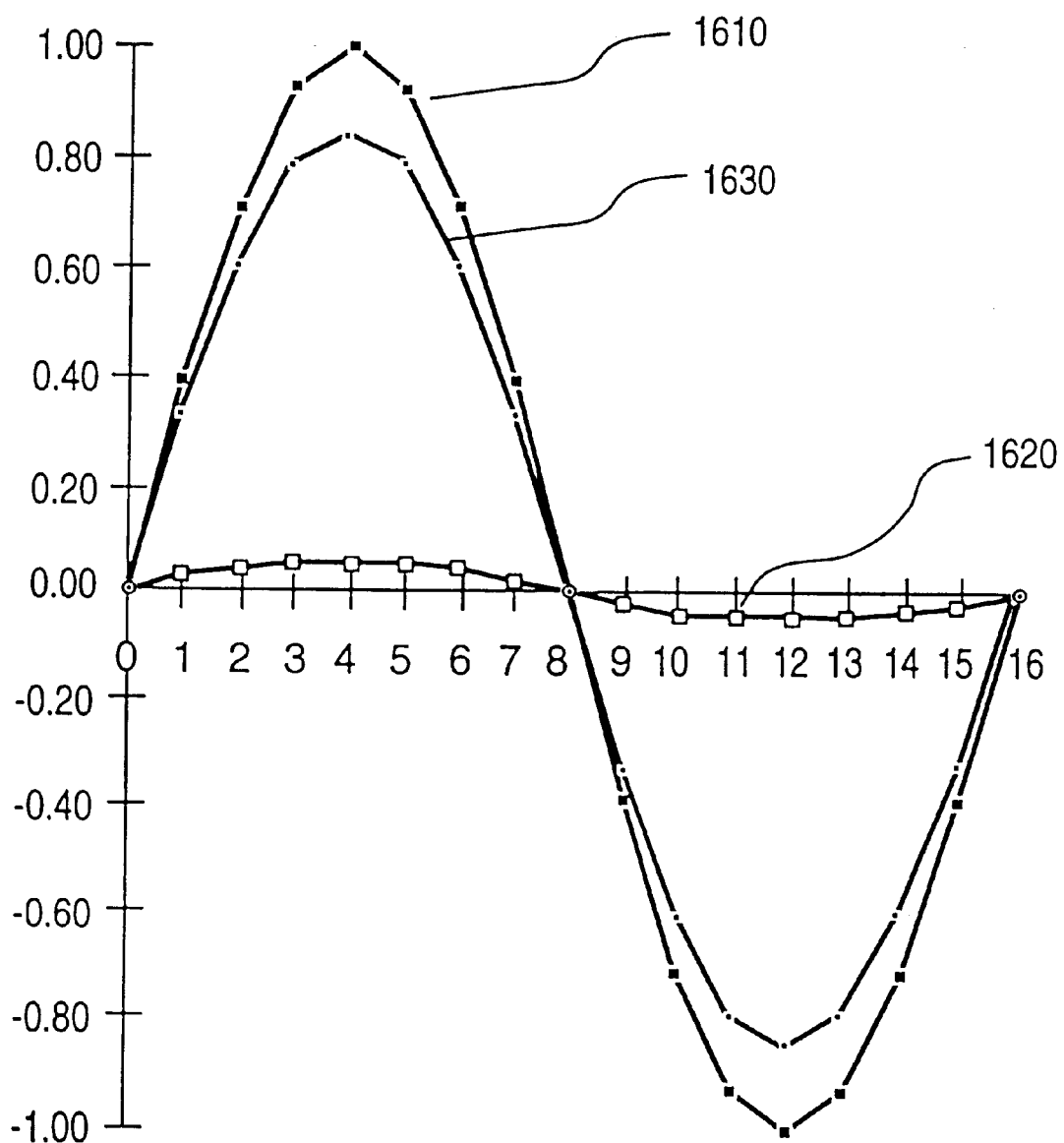
FIG. 16 is a diagram of two sine waves to show coarse amplitude adjustment.

FIG. 16 illustrates how coarse adjustments are made. Trace 1610 contains several baseline amplitude values, and trace 1620 contains several coarse adjustment values to be subtracted from the baseline values. For example, to form an amplitude signal fifteen percent lower than the baseline, shown as trace 1630, microprocessor 1211 subtracts the coarse adjustment values (each at five percent of the corresponding baseline value) from the baseline values three times.

Figure 17:
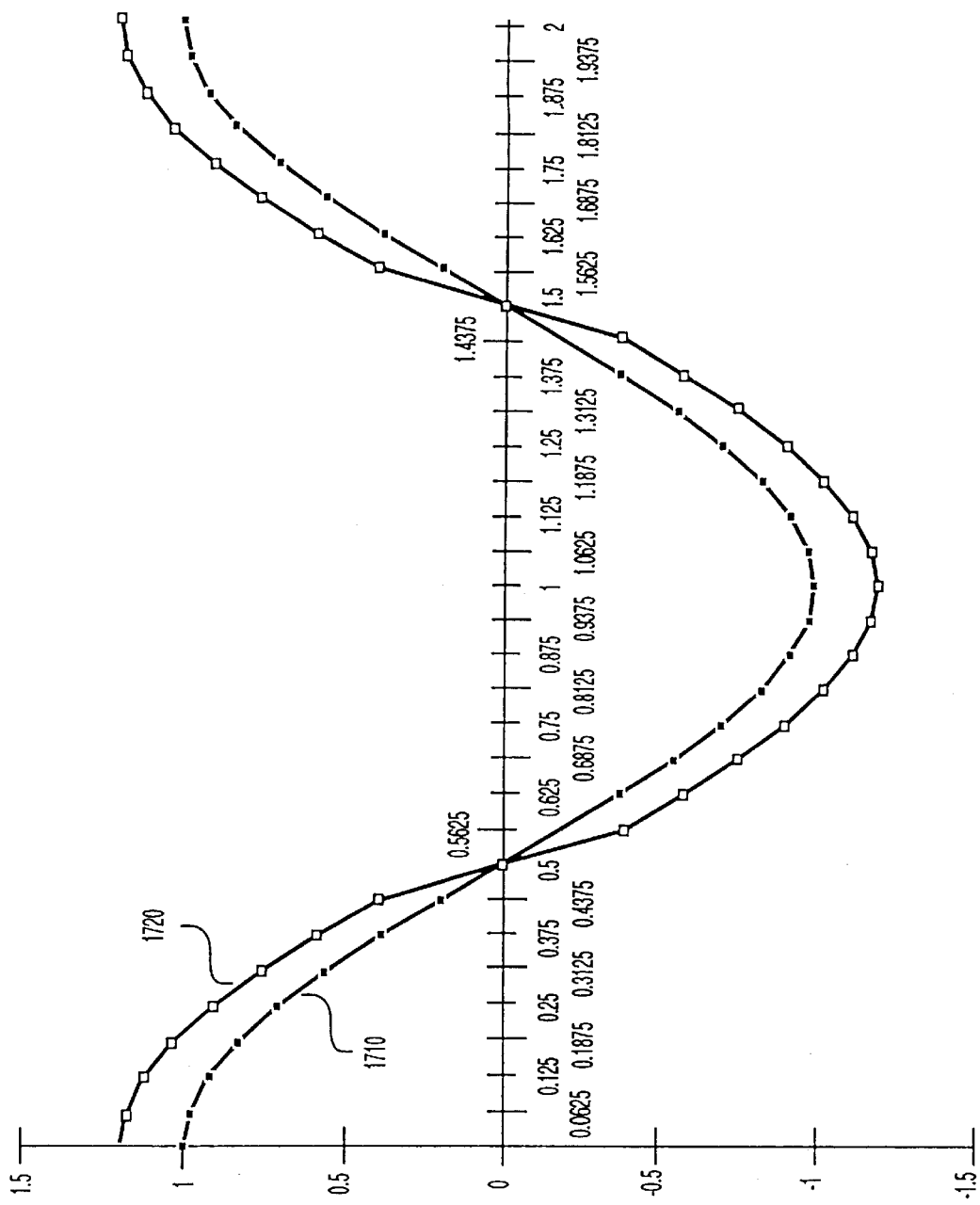
FIG. 17 is a diagram of two traces to show fine amplitude adjustment.

FIG. 17 shows how fine adjustments are made in the preferred implementation. Fine adjustment also requires repeated subtraction, but instead of using a percentage of baseline values, microprocessor 1211 uses a fixed offset. The offset is positive when the baseline value is positive, negative when the baseline value is negative, and zero when the baseline value is zero. Fine adjustment transforms trace 1710 into trace 1720. The fine adjustment tends to distort the sine waveform slightly, but with little noticeable effect.

Figure 18:
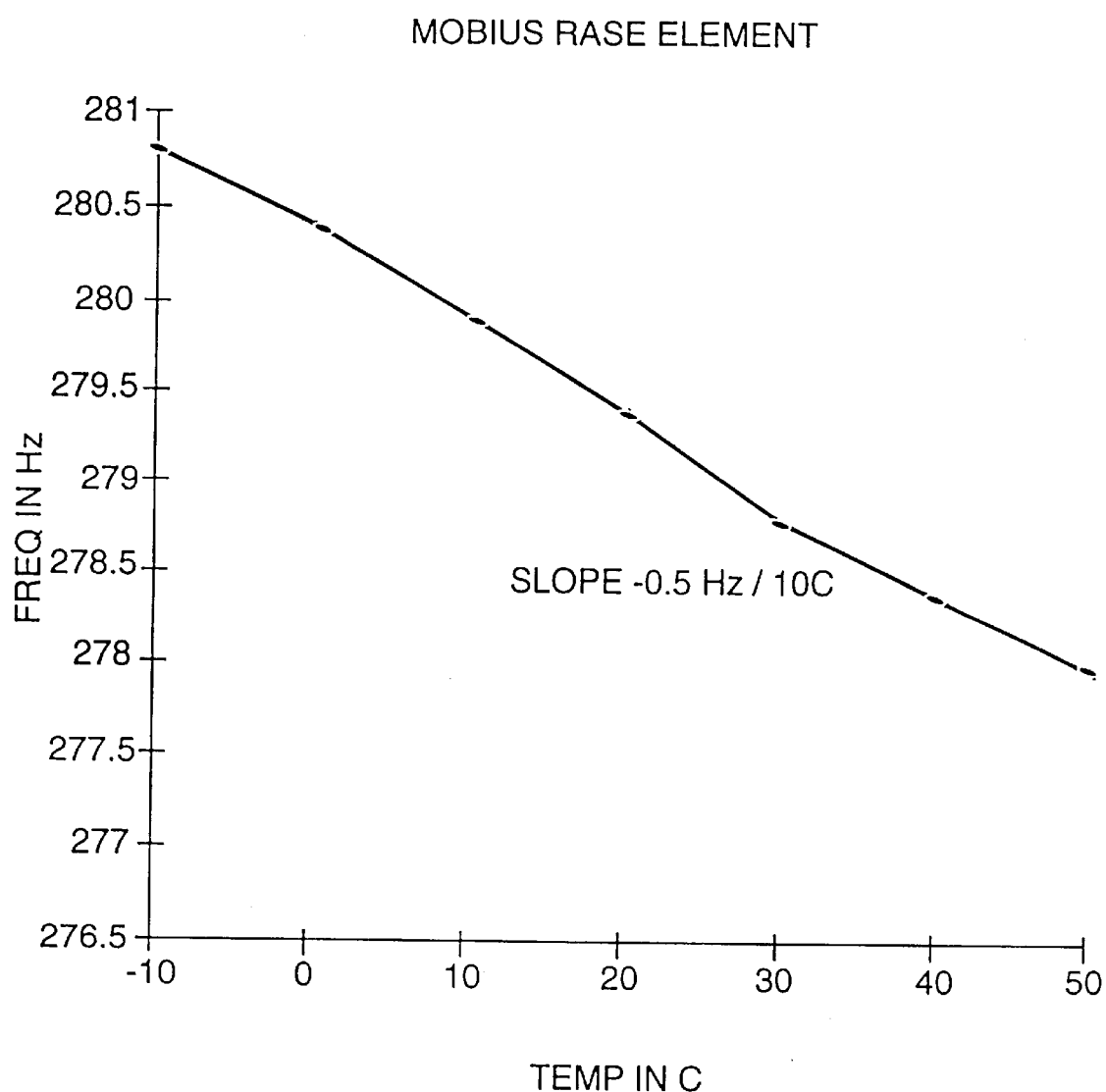
FIG. 18 is a graph showing the changes in the resonant frequency of an RASE with temperature.

In addition, during calibration, microprocessor 1211 uses the ambient temperature signal 1265 to adjust the frequency of the RASE according to the temperature. FIG. 18 shows a typical relationship between temperature in degrees centigrade and resonant frequency in Hz for a RASE. Because the RASE has such a high Q value, it is important to ensure proper temperature compensation.

In the preferred embodiment, microprocessor 1211 forms the values for the higher frequency sine wave as described above, by determining a new voltage value whenever interrupt timer 1213 generates an interrupt signal. Microprocessor 2111 forms a new value for the lower frequency sine wave by accessing ROM 1212 after obtaining some predetermined number of new values for the higher frequency signal. For example, to form a 15 Hz signal from a table with twenty-six values, microprocessor 1211 retrieves a new value for the lower frequency signal every 0.75 cycles of a 300 Hz higher frequency signal.

Figure 19:
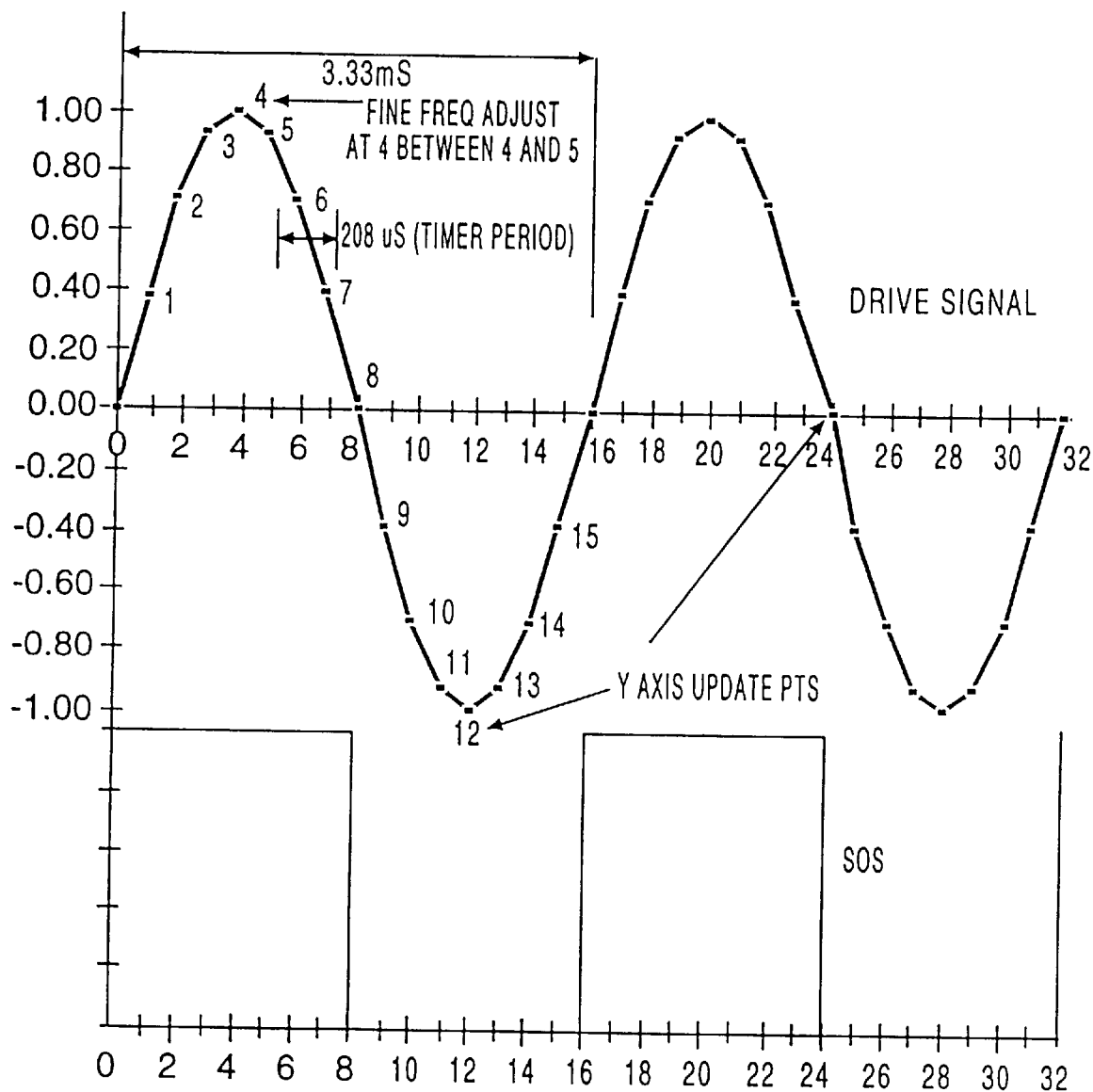
FIG. 19 is a diagram illustrating how the sum of the sine waves for the digital drive signal shown in FIG. 12 is formed.

FIG. 19 demonstrates the formation of a high frequency sine wave for a 300 Hz signal with sixteen values, and a low frequency sine wave with a new value every 0.75 cycles (or every twelve values) of the high frequency sine wave. As explained above, for a 300 Hz signal with sixteen values, microprocessor 1211 would receive an interrupt every 208 us. FIG. 19 also shows the relationship between the SOS signal and digital drive signal 1215. The level of the SOS signal indicates the polarity of the drive signal 1215, and thus the direction of the scan.

Figure 20:
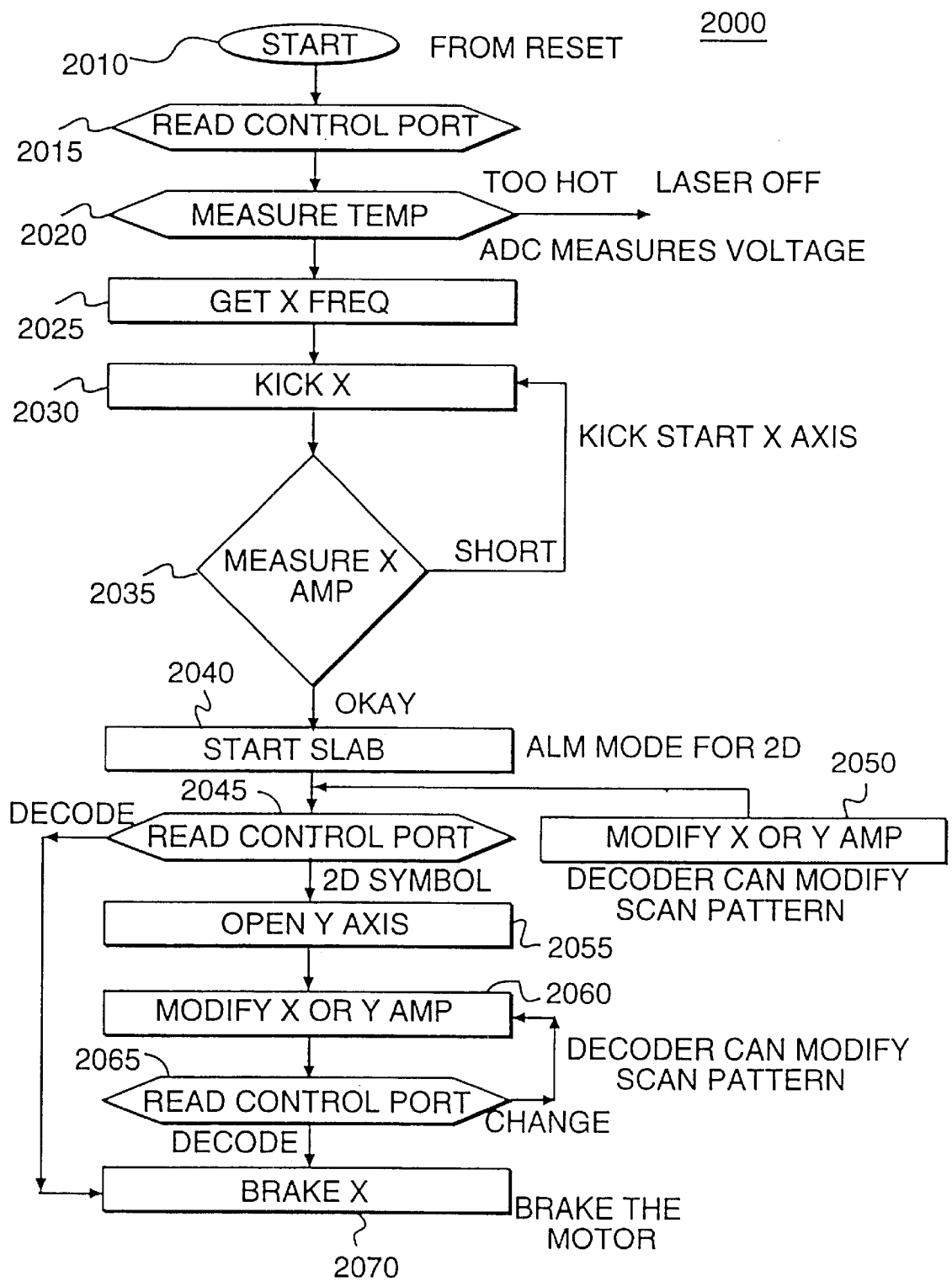
FIG. 20 is a flow chart of the operation for motor control of the scan engine in FIG. 12.

This basic understanding of the key components of scan engine 1200 permits an overview of the entire operation of scan engine 1200. FIG. 20 contains a flow diagram 2000 showing the operations necessary for motor control.

First, the procedure is started either initially or after some sort of reset. (Step 2010) Next, microprocessor 1211 reads the input port from the serial interface 1270 to see what commands to perform. (Step 2015) The first command will likely set some initial values.

Microprocessor 1211 then measures the temperature. (Step 2020) If the temperature is too hot, then controller 1200 sends a LASER OFF signal to shut down the scanner. Otherwise, the procedure continues, and microprocessor 1211 sets the frequency (i.e., period) for the X-axis. (Step 2025)

Next, the X-axis scan starts by providing a maximum input or "kick." (Step 2030) Microprocessor 1211 then measures the maximum amplitude for the X-axis. (Step 2035) The "kick" continues until the maximum X-axis amplitude reaches the baseline value. At this point, the Y-axis signal deflection starts. (Step 2040)

Next, microprocessor 1211 reads the control port again to get the next command. (Step 2045) If the command is to modify the X or Y amplitude, then the modification is accomplished (Step 2050), and the control port is queried again for another command. (Step 2045)

If the command indicates that the symbol is two dimensional, microprocessor 1211 opens the Y-axis to increase-the height of the scanning pattern. (Step 2055) After doing so, microprocessor 1211 modifies the X or Y amplitudes to reflect the change in the scanning pattern. (Step 2060) Afterwards, microprocessor 1211 reads the control port for another command. (Step 2065)

If the command indicates that the scan pattern needs to be modified again, then microprocessor 1211 complies (Step 2060), and reads the control port for the next command. (Step 2065)

At this point, or during an earlier read of the control port (Step 2045), the controller 1210 may receive a command indicating a decode to check the scan engine 1200. In response, microprocessor 1211 brakes the RASE (Step 2070), and waits for the next operation. Preferably, microprocessor 1211 brakes the RASE by driving it 180 degrees out of phase.

Figure 21:
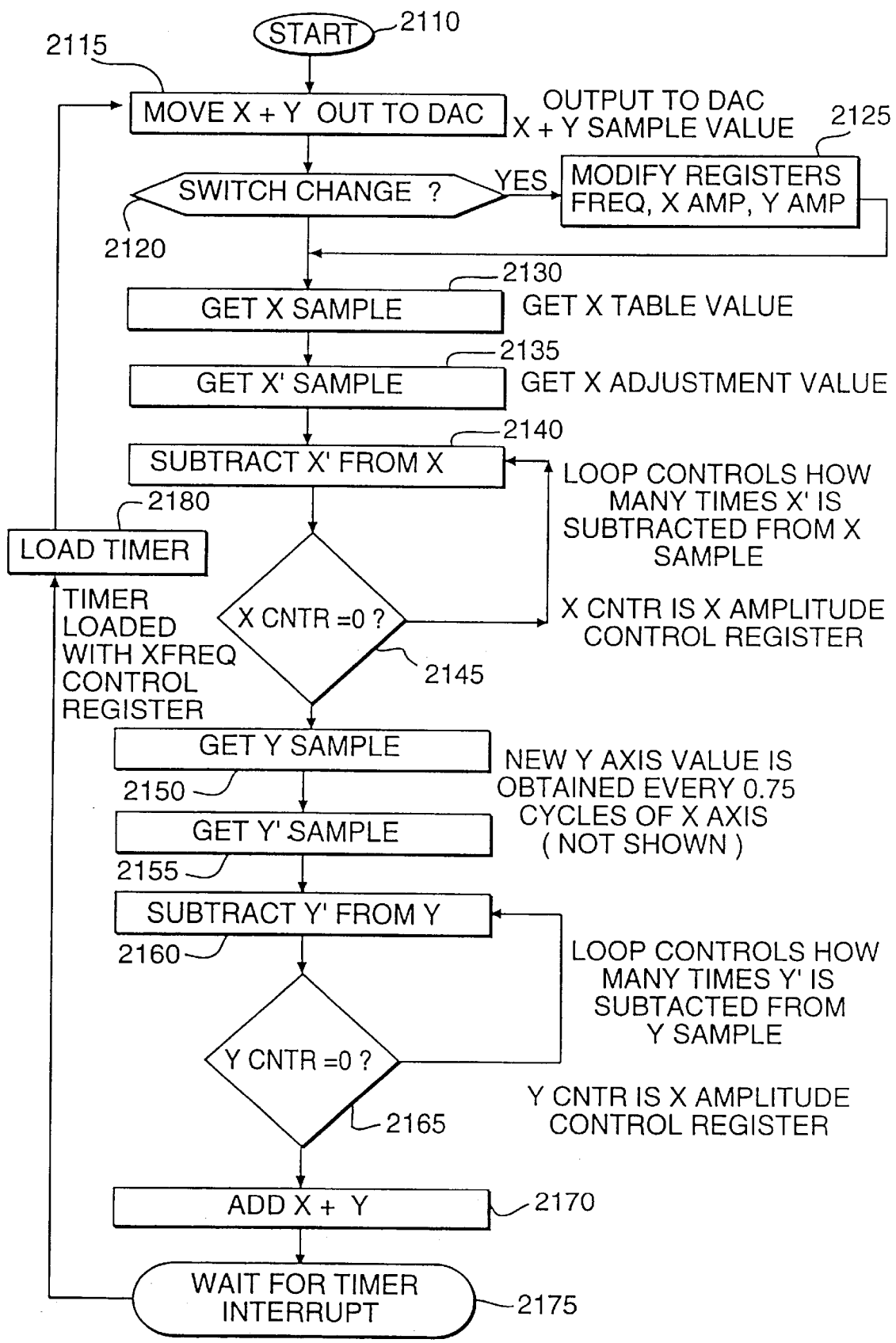
FIG. 21 is a flow chart of the procedure for generating raster scans.

FIG. 21 contains a flow diagram 2100 showing the steps for generating the proper raster scans. After starting (Step 2110), microprocessor 1211 sends the summed sine wave signals to D/A converter 1220. (Step 2115) This will initiate or continue scanning.

Next, microprocessor 1211 determines whether it needs to change the amplitude or frequency values in response to a command from the control port. (Step 2120) If so, microprocessor 1211 modifies the appropriate registers for frequency, X-axis amplitude, or Y-axis amplitude. (Step 2125)

After modifying the registers, or if no change is required, microprocessor 1211 retrieves the next baseline value for the X-axis (Step 2130), and gets the corresponding coarse and fine adjustment values (collectively X'). (Step 2135)

Then a loop begins in which the X' adjustment values are repeatedly subtracted from the X baseline value (Step 2140) a number of times equal to a stored value "xcntr." (Step 2145) Xcntr indicates how much the baseline value needs to be modified. Next, microprocessor 1211 performs a similar set of operations for the Y-axis values. As explained above, this operation occurs every 0.75 cycles of the X-axis sine wave in the preferred embodiment. Similar to the X-axis loop, microprocessor 1211 retrieves the baseline value for the Y-axis (Step 2150) and the corresponding Y fine and coarse adjustment values Y'. (Step 2155) Next, microprocessor subtracts the Y' adjustment values (Step 2160) from the baseline Y value a number of times equal to "ycntr," a stored value similar to xcntr. (Step 2165)

After determining the adjusted X and Y values, microprocessor 1211 adds those values together. (Step 2170) Then it waits for a timer interrupt. (Step 2175)

When the interrupt occurs, microprocessor 1211 reloads a timer value into an X-axis frequency control register. The timer value is either a coarse frequency adjustment, which is preferably the value used between all but two sample points, or a fine frequency value, which is preferably the value used between two sample points to make minor frequency adjustments. (Step 2180) The entire process then repeats with the sum of the adjusted X-axis and Y-axis amplitude values being sent out to D/A converter 1220. (Step 2115)

To complete the understanding of this invention, it is useful to know the specific variables stored in ROM 1212 in the preferred implementation. During initial programming at the factory, technicians preferably assign a value of 30 for maximum Y amplitude variable. Microprocessor 1211 in scan engine 1200 determines coarse adjustment and fine adjustment from the value.

The technician enters the following 8-bit words into a calibration table location in the ROM 1212.

| | |
|---|---|
| Ymax: | Maximum Y amplitude (largest scanning pattern height) |
| Ymin: | Minimum Y amplitude (smallest scanning pattern height) |
| Xdrive: | X amplitude setting used at startup to generate coarse and fine adjustment values |
| Fcrs: | Coarse frequency value (distance between all sample points except for adjustment points) |
| FFine: | Fine frequency value (used during adjustment points) |
| Phase: | Phase reference value for x axis frequency control (value use to find maximum value for phase measurement) |
| Fback: | Amplitude reference used when examining the feedback signal |
| Kcount: | Number of X-axis cycles to apply the Kick. |

This is the only section of the program space of controller 1200 that changes for each scanner.

The calibration table area in ROM 1212 is large enough to support reprogramming. Preferably each scanner's calibration table can be programmed up to four times. To erase old table values, microprocessor 1211 overwrites the table space having those values with NOP instructions ($00_{16}$). It then writes the new calibration table into new, previously reserved memory locations of ROM 1212. When microprocessor 1211 accesses the calibration table, it skips the NOP instructions and increments a program counter until it finds the new table entries.

Usually, a technician need only reprogram the calibration table when a motor is replaced during servicing or if the alignment operator in the factory needs to correct motor alignment errors. In the factory, the scan engine is placed on an alignment fixture that automatically aligns the motor to produce calibration table values.

After a reset, microcontroller 1211 loads the calibration tables from ROM 1212 into a RAM in microprocessor 1211. As the section below entitled "Scan engine interface" explains, the RAM locations can be modified by using the Calibration Mode to effect "on the fly" scan pattern changes. In most cases, however, the scan engine interface allows dynamic scan pattern changes by having the decoder specify amplitudes and opening rates by through commands such as OPEN Y. The normal product commands do not change calibration values, however, and are not part of the Calibration Mode. Scan engine 1200 product commands into control variables microprocessor 1211 uses to manipulate baseline values.

Figure 22A:
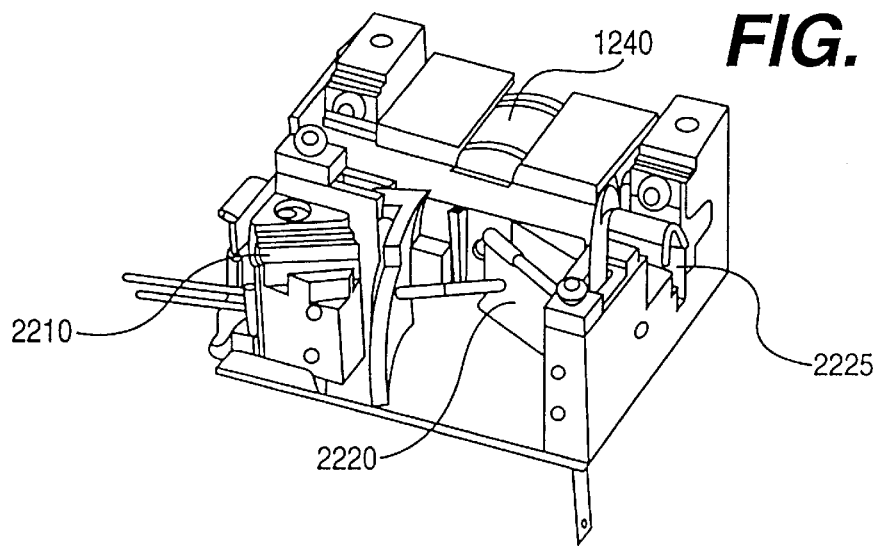
FIGS. 22a–22c are different perspective views of a preferred assembly for the scan engine shown in FIG. 12.

As is apparent from the foregoing description, the design of scan engine 1200 makes its scanning operation powerful and efficient. Another advantage of scan engine 1200 is that it requires very little room. FIG. 22a shows a perspective view of a preferred assembly containing a laser 2210, the RASE mirror 2220, the mylar assembly 2225, and motor coil 1240.

Figure 22B:
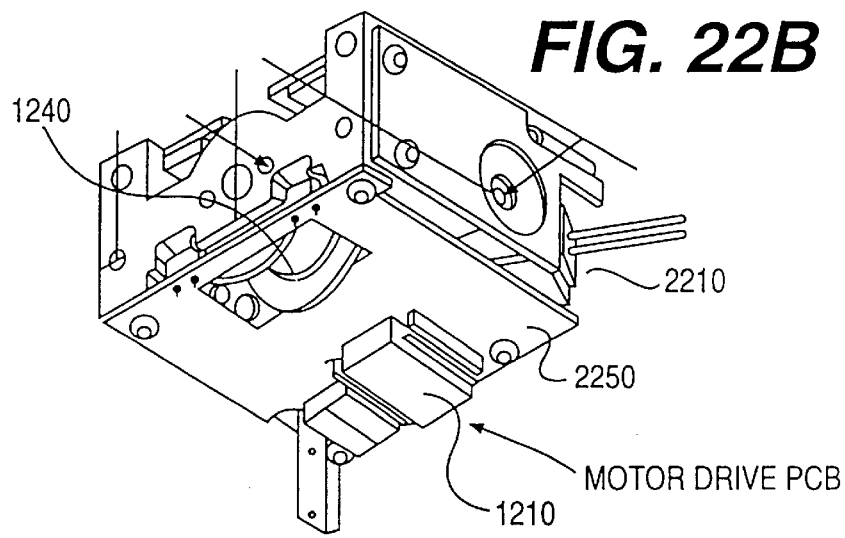

FIG. 22b shows a different perspective view from below the view in FIG. 22a, again showing the laser 2210, with the scan engine drive printed circuit board (PCB) 2250 mounted below laser 2210 and coil 1240. The scan engine drive PCB 2250, which contains the electronics shown in FIG. 12 has controller 1210 as its largest element.

Figure 22C:
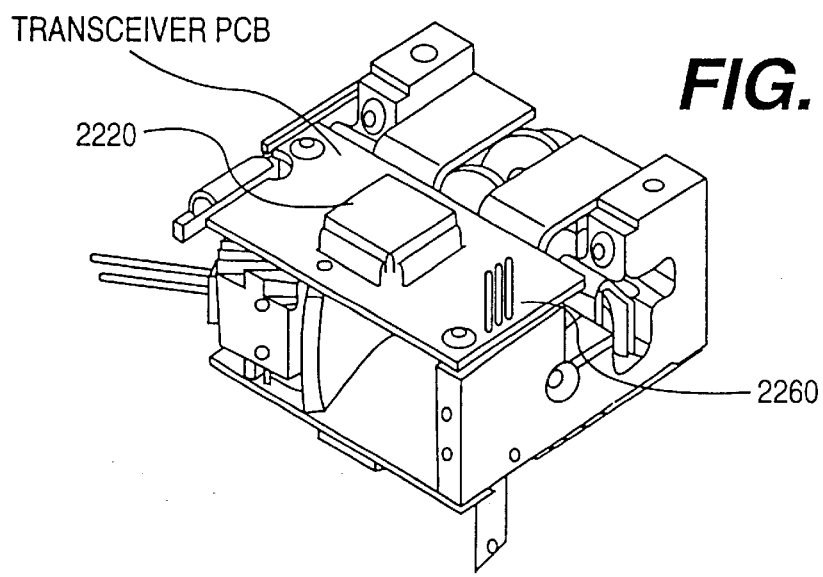

FIG. 22c shows the relationship of the detector 2220 and its PCB 2260. The decoder circuitry is preferably located on a different PCB at another portion of the scanner.

2. Precession

Another feature of the preferred embodiment that is not readily apparent is the reason for choosing the lower frequency at 15 Hz. After all, FIG. 15a suggests several different frequencies would provide an adequate response. The reason for choosing 15 Hz is that the X-axis scanning frequency of 290 Hz is not an integer multiple of 15 Hz. The actual ratio is about 19.5.

When the X-axis scanning frequency is not an integer multiple of the Y-axis scanning frequency, the scanning pattern will tend to precess, or roll, because the movements along the two axes do not begin simultaneously. Although some may find such precession a disadvantage, it can actually be helpful in scanning different parts of a bar code symbol.

Figure 23A:
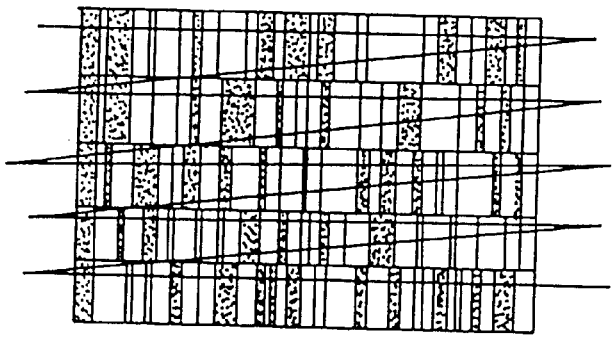
FIGS. 23a–23c shows a scanning pattern and it precesses.
Figure 23B:
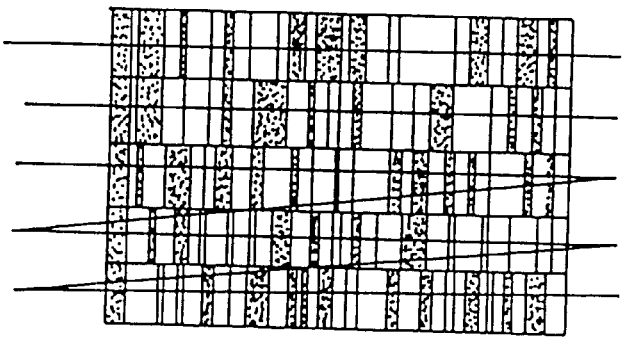
Figure 23C:
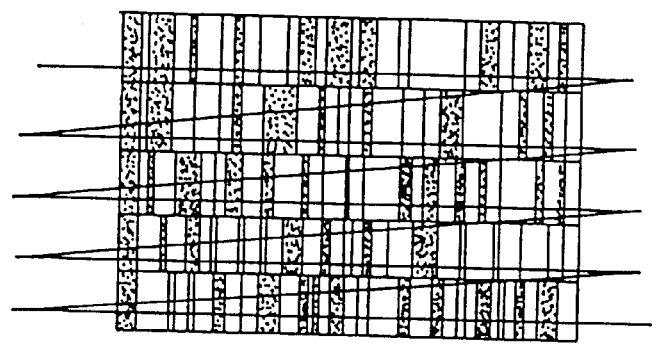

For example, a bar code may have some portions that are difficult to read or the rows may be closely packed. In that case, precession of the scanning pattern ensures that successive scans traverse different parts of the symbol and provide more accurate readings, FIGS. 23a–23c shows successive scanning patterns during precession. As the patterns demonstrate, the scans traverse different paths through the pattern to provide better overall coverage.

In the preferred implementation, the precession, whose rate depends on the ratio of the X-axis and Y-axis frequencies, is designed into each scanner. Proper programming of ROM 1212, such as during calibration, can change or even eliminate precession.

3. Scan Engine Interface

Figure 24:
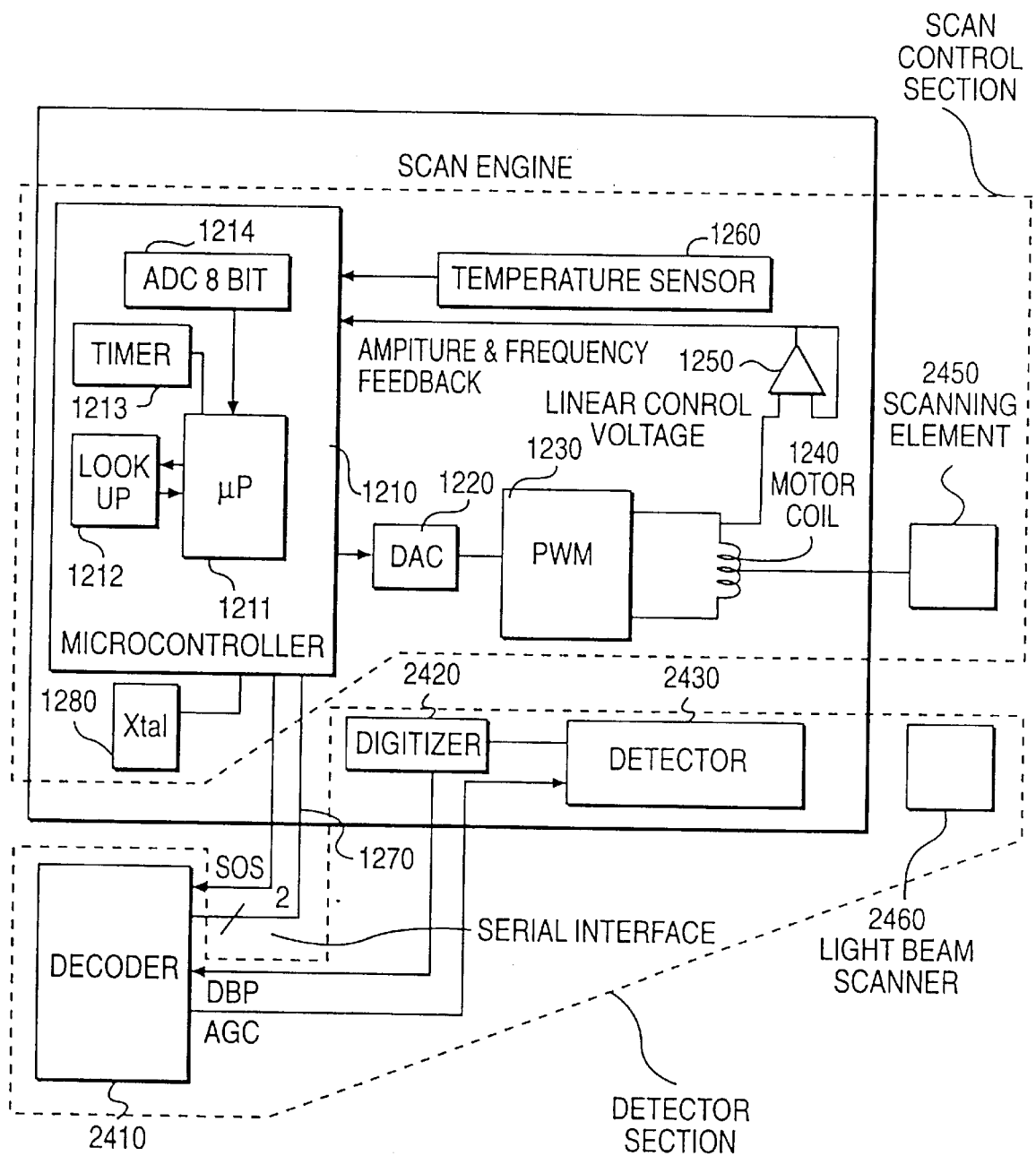
FIG. 24 is a block diagram of the scan engine in FIG. 12 and its interfaces with other subsystems.

As the previous discussions suggest, scan engine 1200 must communicate with other portions of scanner 100. FIG. 24 is a block diagram showing the interfaces between scan engine 1200 decoder 2410, digitizer 2420, and optical detector 2430. In FIG. 24, optical detector 2430 receives the reflected light and outputs electrical signals reflecting the levels of received light. Digitizer 2420 forms the DBP signals discussed above from those electrical signals.

Decoder 2410 represents the circuitry for both decoding the bar code data and controlling the operation of scanner 100. As FIG. 24 shows, decoder 2410 receives SOS signal 1290 from scan engine 1200, and exchanges commands and data with microprocessor 1211 via ZIF serial interface 1270. Decoder 2410 also receives DBP data from digitizer 2420 and sends automatic gain control signals back to detector 2430 to ensure high quality resolution.

Most of the signals and interfaces shown in FIG. 24 have been described above. An important one which has not is the ZIF serial interface 1270. The interface is very powerful because it allows scan engine 1200 to operate with the rest of scanner 100 and produce the advantages listed in the prior description.

Figures 25, 26:
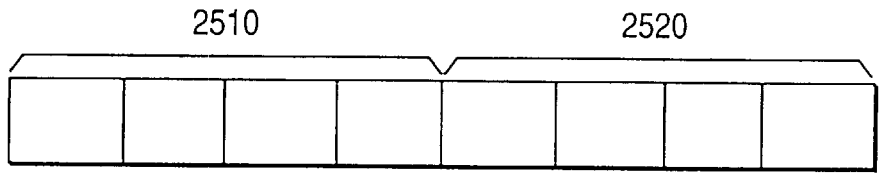
FIG. 25 is a diagram of the preferred formats for commands and messages exchanged with the scan engine shown in FIG. 12.
FIG. 26 is a list of the commands and messages exchanged using the format of FIG. 25.

FIG. 25 shows a preferred format for the commands and messages exchanged over ZIF interface 1270. The commands and messages are sent in eight-bit bytes 2500. Each byte has two four-bit nibbles, shown as nibble 2510 and nibble 2520. Nibble 2510 preferably carries the command and message identifier, and nibble 2520 carries any data required by the message of the command.

FIG. 26 shows a list of the commands and messages exchanged over ZIF serial interface 1270 between scan engine 1200 and decoder 2410 in the preferred embodiment. There are eight commands from decoder 2410 to scan engine 1200 and five messages from scan engine 1200 to decoder 2410.

The CALIBRATION command is principally used in the factory to calibrate scan engine 1200. In the preferred embodiment, microprocessor 1211 only responds to the CALIBRATION command if the SOS signal 1290 is low. If not, microprocessor 1211 will ignore this command.

The specific purpose of calibrating is to change or read the RAM in microprocessor 1211. Calibration provides a first approximation of the scanning element parameters that are later adjusted on feedback.

Nibble 2520 in the CALIBRATION command can indicate that the RAM mode should be read (0001), that the RAM mode should be written (0000), or that the calibration mode should be exited (0010). If the scan engine is already in the calibration mode, additional modes, such as read, write or exit, can be set without holding SOS signal 1290 low.

To change the contents of a RAM address, decoder 2410 places scan engine 1200 in the Write RAM Calibration mode and sends it to the desired RAM address (one byte). In response, scan engine 1200 echoes the address to decoder 2410, which then checks whether the echo was correct. Next, decoder 2410 sends data for that RAM address, and scan engine 1200 echoes the data for decoder 2410 to check.

To read a RAM location, decoder 2410 places scan engine 1200 in the Read RAM Calibration mode and sends the desired address of the RAM (one byte). In response, scan engine 1200 sends back the data from the indicated RAM address.

These two mechanisms allow decoder 2410 to change the parameters of scan engine 1200 dynamically. For example, this is how decoder 2410 could change the X-axis and Y-axis amplitudes during scanning.

The AIM SLAB command tells scan engine 1200 to place the scan element into a predefined pattern for aiming or initial acquisition. This command does not control the laser, however.

The AIM DOT command tells scan engine 1200 to place the scan element into a predefined pattern for dot aiming in the sunlight. This command also does not control the laser.

The SET Y ANGLE command tells scan engine 1200 the maximum angle to open in the Y direction in response to an OPEN Y command later issued. This command has data in nibble 2520 identifying one of sixteen possible angles.

The OPEN Y command tells scan engine 1200 to open the Y raster pattern at one of sixteen possible opening rates. The rate is encoded in nibble 2520. If the OPEN Y command is sent without a SET Y ANGLE command, scan engine 1200 will select as a default the maximum angle. If another angle is desired, the OPEN Y command should immediately follow the SET Y ANGLE command.

The CLOSE Y command tells scan engine 1200 to close the Y raster pattern. The rate is encoded in nibble 2520 and can have one of sixteen possible values.

The BRAKE command tells scan engine 1200 to apply braking to the X motion, the Y motion, or both. Parameters in nibble 2520 indicate which motion should be braked.

The STATUS REQUEST command asks for status from scan engine 1200. The scanner responds with the current status of the scan element and the laser.

The OPEN Y DONE message is a status message that scan engine 1200 has reached the maximum programmed Y opening. This message only follows an OPEN Y command.

The CLOSE Y DONE message is a status message sent when scanning engine 1200 finishes closing the raster in the Y direction. It only follows a CLOSE Y command.

The STATUS message is scan engine 1200's response to a STATUS command. It indicates the status of the laser and the scan element in nibble 2520.

The RESET DONE message is sent following a successful power up, and indicates that scan engine 1200 may now receive commands on ZIF serial interface 1270. Nibble 2520 contains the version number of the scan engine software executed by microprocessor 1211.

4. Simplified Scanning Height Control

Figure 27:
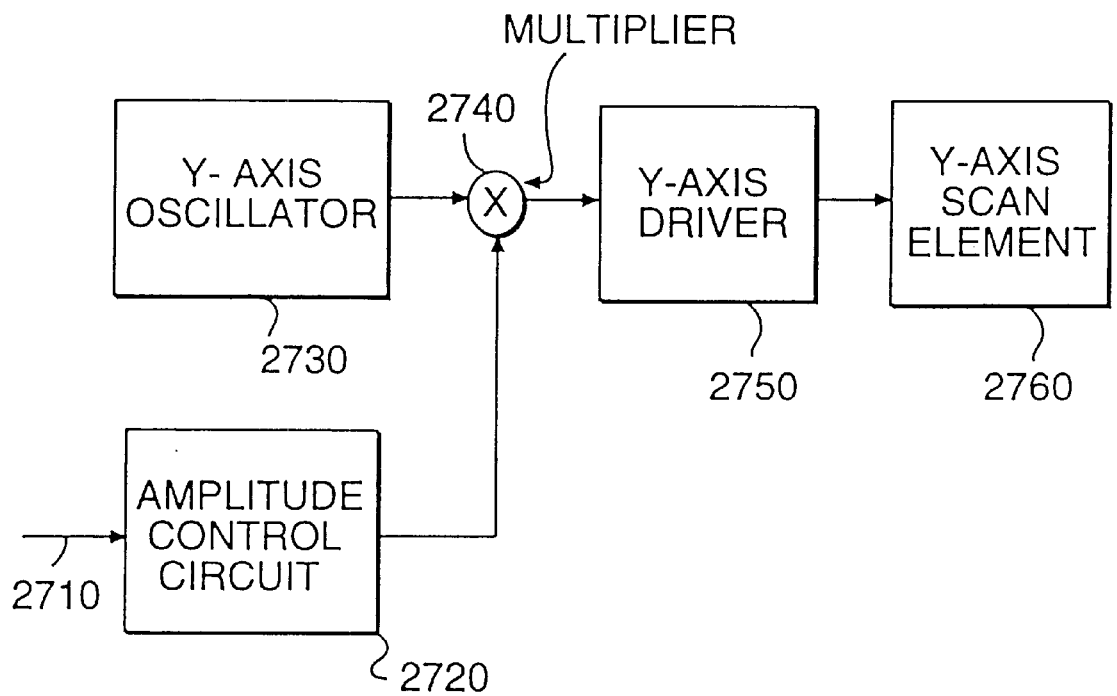
FIG. 27 is a block diagram of a circuit for changing the height of a raster scan pattern.

Certain aspects of the inventions described above do not require the use of a scan engine such as scan engine 1200. For example, the change in scanning height can be accomplished with much simpler circuitry that lacks the flexibility and robustness of scanner engine 1200. FIG. 27 shows one type of circuit 2700.

Circuit 2700 receives as an input signal 2710 indicating that the bar code being sensed is a two-dimensional bar code. Signal 2710 feeds an amplitude control circuit 2720 generating a control signal $V_c$ to increase the height of a scanning pattern when the symbol being sensed is encoded in a two-dimensional bar code.

Figure 28:
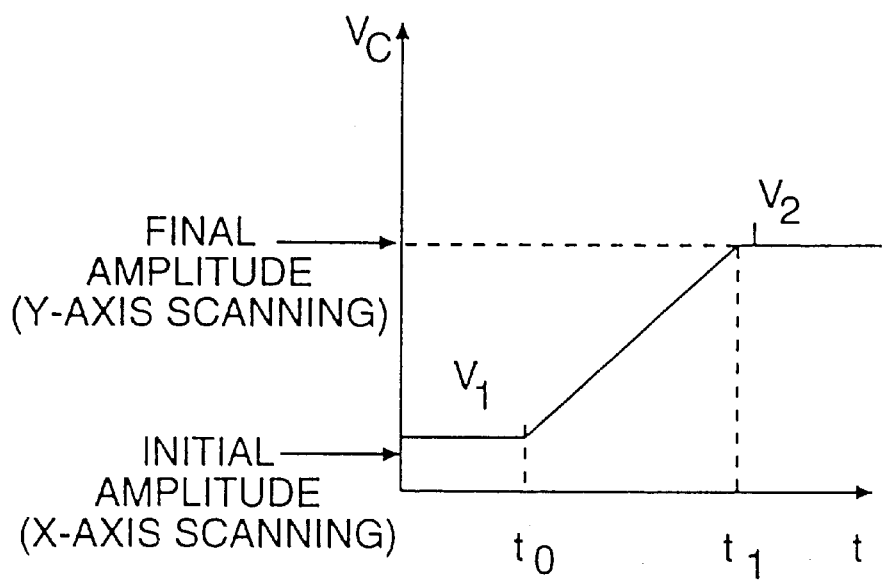
FIG. 28 shows the variation of one of the signals of FIG. 27 as a function of time.

FIG. 28 shows $V_c$ as a function of time. $V_c$ remains at an initial amplitude $V_1$ until scanning with a larger pattern is initiated at time $t_0$. At that time, $V_c$ climbs linearly until time $t_1$, when the pattern has expanded to its maximum height. At that time, $V_c$ is at voltage $V_2$.

In circuit 2700, multiplier 2740 mixes $V_c$ with the signal from Y-axis oscillator 2730. Y-axis driver 2750 then uses the mixed signal to control the Y-axis scanning element 2760, such as the mylar mount for the RASE.

Circuit 2700 therefore operates for all modes. When scanner 100 is not scanning, or when it is scanning one-dimensional bar codes, $V_c$ remains at its initial value $V_1$. When scanner 100 is scanning two-dimensional bar codes, circuit 2700 increases $V_c$ to generate a larger pattern.

Figure 29:
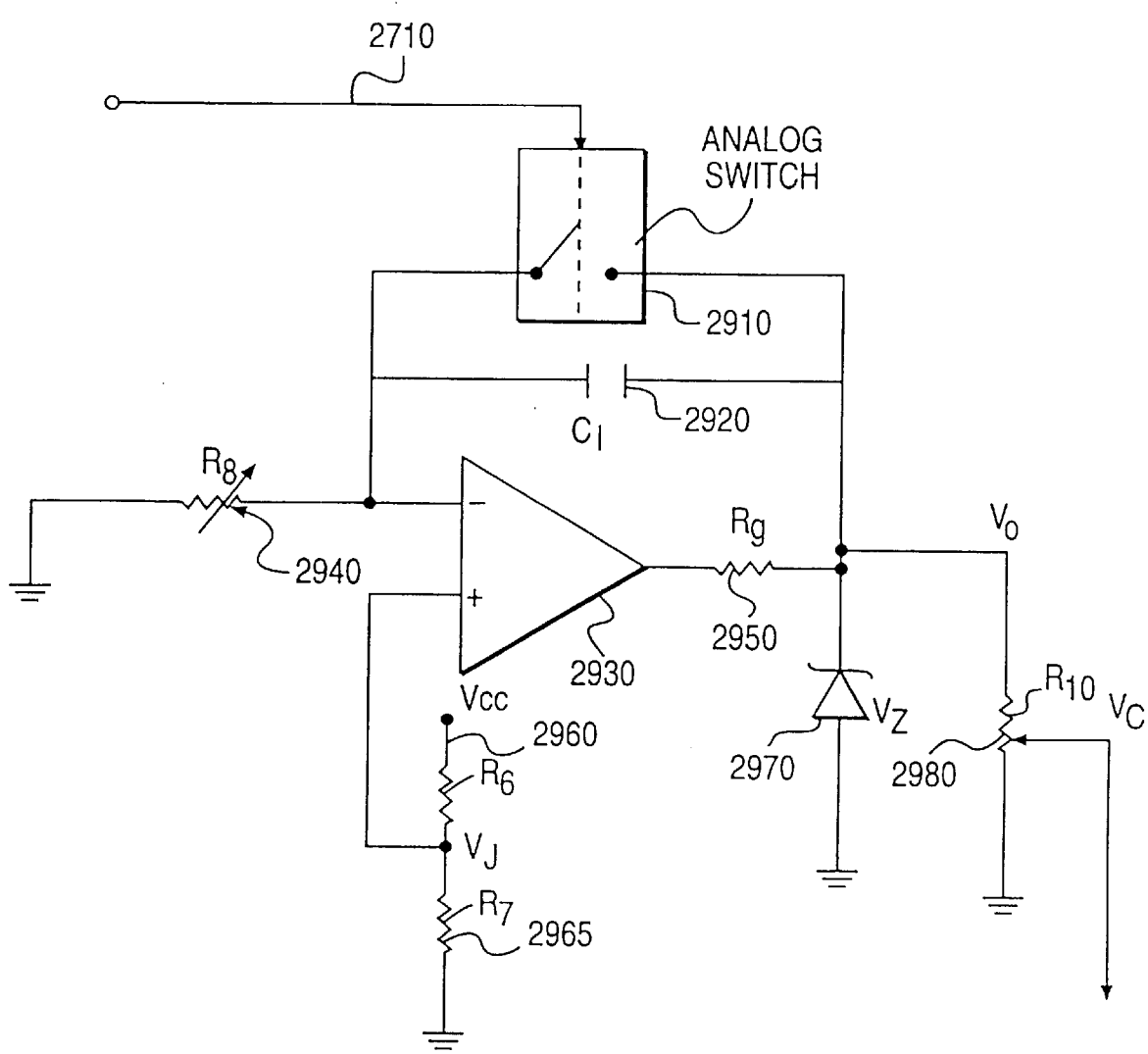
FIG. 29 shows a block diagram of an amplitude control circuit used in FIG. 27.

FIG. 29 shows a preferred embodiment of amplitude control circuit 2720 to generate $V_c$. Signal 2710 controls analog switch 2910 connected in parallel across a charging capacitor 2920 having a value $C_1$.

One side of both capacitor 2920 and switch 2910 connects to the inverting terminal of operation amplifier 2930 and to one side of variable resistor 2940. The other side of resistor 2940 connects to ground. The value of resistor 2940 is $R_8$. The other side of capacitor 2920 and switch 2910 connects through resistor 2950 to the output of operational amplifier 2930. The value of resistor 2950 is $R_9$.

The non-inverting input of operational amplifier 2930 connects to the junction of a voltage divider formed by resistors 2960 and 2965 having values $R_6$ and $R_7$, respectively. Resistor 2960 also connects to a supply voltage Vcc, and resistor 2965 also connects to ground. This circuit sets a voltage $V_j$ at the junction between resistors 2960 and 2965.

The junction of switch 2910, capacitor 2920, and resistor 2950 also connects to a zener diode 2970 and forms the output voltage signal Vo. Zener diode 2970, which has a breakdown voltage of $V_z$, also connects to ground. The value of resistor 2950, $R_9$, is chosen to limit the current in zener diode 2970 to safe levels.

Output voltage Vo appears at one end of potentiometer 2980, whose value is $R_{10}$. The other end of potentiometer 2980 is ground, and the control voltage $V_c$ appears at potentiometer 2980's wiper arm.

When the scanner is not scanning a two-dimensional bar code symbol, signal 2710 is LOW and switch 2910 is closed. This discharges capacitor 2920 and forces $V_o$ to equal $V_j$. That, in turn, sets $V_c$ to a constant value.

When scanning a two-dimensional bar code, signal 2710 is HIGH, switch 2910 is open. This charges capacitor 2920 at a rate set by $Vj$, $R_8$, and $C_1$. Circuit 2720 then operates as an integrator, causing the voltage $V_o$ to grow linearly until reaching the breakdown voltage $V_z$ of zener diode 2970. At that point $V_o$ will rise no further. Control voltage $V_c$ follows suit. Voltage $V_o$ remains at voltage $V_z$ until switch 2910 closes, discharging capacitor 2920 rapidly and forcing $V_o$ to decrease to $V_j$.

VI. CONCLUSION

The foregoing embodiments and implementations of this invention are not intended to limit the invention to the details shown. Instead, various modifications and structural changes may be made without departing from the spirit of the present invention.

The foregoing description fully reveals the gist of the present invention that others can readily adapt it for various applications without omitting features that, from the standpoint of prior art, fairly constitute essential characteristics of the generic or specific aspects of this invention. Therefore, such adaptations should and are intended to be comprehended within the meaning and range of equivalence of the following claims.

What is claimed is:

1. A system for controlling a motor to oscillate in opposite senses and which is operative to drive an optical scan beam over a scan angle to scan a certain distance over a field of view, and which motor has a coil, said system comprising means for switching current flow direction in the coil, means for generating a selectable high current threshold and a low current threshold for the magnitude of said current flow, means for comparing said thresholds and the current flow in the coil for operating said switching means for turning the current to the coil off and on when the high and low thresholds are reached respectively to control the current in said coil thereby controlling said motor to scan said beam over said certain distance.

2. The system according to claim 1 wherein said generating means includes digital control means for generating digital values representing said thresholds.

3. The system according to claim 2 wherein said digital control means includes a computer for selecting said values.

4. The system according to claim 3 further comprising means for monitoring said scan angle for varying said values to change or counteract variations of the scan angle.

5. The system according to claim 4 wherein said monitoring means includes, means for sensing said current flow and providing an input corresponding thereto to said computer.

6. The system according to claim 1, wherein said switching means comprises a bridge across which said coil is connected.

7. The system according to claim 1 further comprising means in said current switching means for changing the direction of said current at a given scanning rate to cause said motor to produce oscillatory movement at said rate.

8. The system according to claim 1, wherein said comparing means comprises means coupled to said generating means for digitally storing the high and low current thresholds, means for converting said thresholds into analog levels, and analog comparison means for providing switching signals to said switching means when current flows reach magnitudes corresponding to said thresholds.

* * * * *